US012776167B2

(12) United States Patent
Merg et al.

(10) Patent No.: US 12,776,167 B2
(45) **Date of Patent: *Oct. 27, 2026**

(54) METHOD AND SYSTEM FOR OUTPUTTING DIAGNOSTIC CONTENT BASED ON CAPABILITY OF DIAGNOSTIC DEVICE SELECTED TO RECEIVE CONTENT

(71) Applicant: Snap-on Incorporated, Kenosha, WI (US)

(72) Inventors: Patrick S. Merg, Hollister, CA (US); Roy Steven Brozovich, Campbell, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/044,847

(22) Filed: Feb. 4, 2025

(65) Prior Publication Data

US 2025/0182533 A1 Jun. 5, 2025

Related U.S. Application Data

(63) Continuation of application No. 18/457,493, filed on Aug. 29, 2023, now Pat. No. 12,249,192, which is a (Continued)

(51) Int. Cl.

| | |
|---|---|
| ***G07C 5/00*** | (2006.01) |
| ***G06Q 10/20*** | (2023.01) |
| ***G07C 5/08*** | (2006.01) |

(52) U.S. Cl.

CPC ............. *G07C 5/006* (2013.01); *G06Q 10/20* (2013.01); *G07C 5/0808* (2013.01); *G07C 5/0816* (2013.01); *G07C 2205/02* (2013.01)

(58) Field of Classification Search

CPC .... G07C 5/006; G07C 5/0808; G07C 5/0816; G07C 2205/02; G06Q 10/20

See application file for complete search history.

(56) References Cited

U.S. PATENT DOCUMENTS

| | | | |
|---|---|---|---|
| 9,117,319 | B2 | 8/2015 | Chen et al. |
| 2008/0071439 | A1 | 3/2008 | Bertosa et al. |

(Continued)

FOREIGN PATENT DOCUMENTS

| | | | |
|---|---|---|---|
| WO | 2015/112813 | A1 | 7/2015 |
| WO | 2018/031721 | A1 | 2/2018 |

OTHER PUBLICATIONS

International Searching Authority, International Search Report and Written Opinion for PCT Patent Application No. PCT/US2018/063936 mailed Feb. 1, 2019.

*Primary Examiner* — Yuen Wong

(74) *Attorney, Agent, or Firm* — McDonnell Boehnen Hulbert & Berghoff LLP

(57) ABSTRACT

Methods and apparatus are provided for repairing vehicles. A particular vehicle can be repaired during a repair session using a computing device. The repair session can include the computing device: receiving a functional task setup with first and second identifiers, the first identifier identifying the particular vehicle, and the second identifier identifying a particular functional task for the computing device to perform on the particular vehicle; determining whether the computing device is available to perform the particular functional task; after determining the computing device is available to perform the particular functional task, receiving an input to initiate performance of the particular functional task on the particular vehicle; after receiving the input, sending a message to the particular vehicle to initiate performance of the particular functional task on the particu- (Continued)

lar vehicle; and after sending the message, displaying a notification indicative of performing the particular functional task.

20 Claims, 14 Drawing Sheets

Related U.S. Application Data continuation of application No. 18/155,381, filed on Jan. 17, 2023, now Pat. No. 11,783,640, which is a continuation of application No. 17/121,606, filed on Dec. 14, 2020, now Pat. No. 11,587,364, which is a continuation of application No. 15/904,263, filed on Feb. 23, 2018, now Pat. No. 10,878,642.

(56) References Cited

U.S. PATENT DOCUMENTS

| | | | | |
|---|---|---|---|---|
| 2008/0071882 | A1 | 3/2008 | Hering et al. | |
| 2011/0106374 | A1 | 5/2011 | Margol et al. | |
| 2015/0121275 | A1 | 4/2015 | Marshall et al. | |
| 2016/0335816 | A1* | 11/2016 | Thoppae .............. | G07C 5/0808 |
| 2019/0266808 | A1 | 8/2019 | Merg et al. | |
| 2021/0097778 | A1 | 4/2021 | Merg et al. | |
| 2023/0154241 | A1 | 5/2023 | Merg et al. | |
| 2023/0401900 | A1 | 12/2023 | Merg et al. | |

* cited by examiner

400

Computing Device CD2

Display 600

To Verify Injector Operation:

1. To start, either

A. Use the menu system of CD1 to go to Scanner -> System -> Engine -> Functional Tests -> Injector Balance After displaying the Injector Balance screen, CD1 will display some instructions for connecting fuel lines and a fuel pressure gauge between CD1 and the vehicle being repaired.

Make sure the vehicle's ignition is ON and its engine is OFF.

After that, use the menu system of CD1 to select "Continue" after reviewing these instructions to start injector testing.

OR

B. Ensure that:

i. All fuel lines for the vehicle being repaired are connected to CD1,
      ii. A fuel pressure gauge is connected to the fuel line of the vehicle,
      iii. The vehicle's Ignition is ON, and
      iv. The vehicle's Engine is OFF.

Then, take the following link to direct CD1 to begin injector testing one injector at a time: Injector Balance Link ~ Link 610

2. Each injector can be tested individually either

A. Using the menu system of CD1 to toggle each injector –
      Injector #1, Injector #2 …

OR

B. Using the links below to direct CD1 to toggle an individual injector:

Links 620:

| | | | |
|---|---|---|---|
| **Injector #1** | **Injector #2** | **Injector #3** | ~ Link 622 |
| **Injector #4** | **Injector #5** | **Injector #6** | ~ Link 624 |
| **Injector #7** | **Injector #8** ~ Link 626 | | |

*Please note that each injector can only be pulsed once per injection cycle.*

3. Compare fuel pressure loss for all injectors to verify injector operation.

End Session ~ Button 630

FIG. 6

METHOD AND SYSTEM FOR OUTPUTTING DIAGNOSTIC CONTENT BASED ON CAPABILITY OF DIAGNOSTIC DEVICE SELECTED TO RECEIVE CONTENT

REFERENCE TO RELATED APPLICATION

This application is a continuation application of U.S. patent application Ser. No. 18/457,493, entitled Method and System for Outputting Diagnostic Content Based on Capability of Diagnostic Device Selected to Receive Content, which was filed on Aug. 29, 2023 and published on Dec. 14, 2023 as United States Patent Application Publication No. US 2023/0401900 A1.

U.S. patent application Ser. No. 18/457,493 is a continuation application of U.S. patent application Ser. No. 18/155,381, entitled Method and System for Outputting Diagnostic Content Based on Capability of Diagnostic Device Selected to Receive Content, which was filed on Jan. 17, 2023 and published on May 18, 2023 as United States Patent Application Publication No. US 2023/0154241 A1.

U.S. patent application Ser. No. 18/155,381 is a continuation application of U.S. patent application Ser. No. 17/121,606, entitled Method and System for Outputting Diagnostic Content Based on Capability of Diagnostic Device Selected to Receive Content, which was filed on Dec. 14, 2020 and published on Apr. 1, 2021 as U.S. Patent Application Publication No. 2021/0097778 A1.

U.S. patent application Ser. No. 17/121,606 is a continuation application of U.S. patent application Ser. No. 15/904,263, entitled Method and System for Outputting Diagnostic Content Based on Capability of Diagnostic Device Selected to Receive Content, which was filed on Feb. 23, 2018 and was published on Aug. 29, 2019 as U.S. Patent Application Publication No. 2019/0266808 A1.

U.S. patent application Ser. No. 15/904,263, and United States Patent Application Publication No. 2019/0266808 A1 are incorporated herein by reference.

BACKGROUND

Unless otherwise indicated herein, the materials described in this section are not prior art to the claims in this application and are not admitted to be prior art by inclusion in this section.

Vehicles, such as automobiles, light-duty trucks, and heavy-duty trucks, play an important role in the lives of many people. To keep vehicles operational, some of those people rely on vehicle technicians to diagnose and repair their vehicle.

Vehicle technicians use a variety of tools in order to diagnose and/or repair vehicles. Those tools may include common hand tools, such as wrenches, hammers, pliers, screwdrivers and socket sets, or more vehicle-specific tools, such as cylinder hones, piston-ring compressors, and vehicle brake tools. The tools used by vehicle technicians may also include electronic tools such as a vehicle scan tool or a digital voltage-ohm meter (DVOM), for use in diagnosing and/or repairing a vehicle.

The vehicle scan tool and/or DVOM can be linked via wired and/or wireless link(s) to other devices, perhaps to communicate data about the vehicle. The vehicle scan tool and/or DVOM can provide a significant amount of data to aid diagnosis and repair of the vehicle. This data is provided using a number of different functions of the vehicle scan tool and/or DVOM including functions for scanning for diagnostic data and functions performing tests on the vehicle.

SUMMARY

In one aspect, a method is provided. A particular vehicle is repaired during a repair session using a computing device. The repair session includes: the computing device receiving, a functional task setup that includes a first identifier and a second identifier, where the first identifier identifies the particular vehicle, and where the second identifier identifies a particular functional task for the computing device to perform on the particular vehicle; using the computing device to determine whether the computing device is available to perform the particular functional task; after determining that the computing device is available to perform the particular functional task, the computing device receiving an input to initiate performance of the particular functional task on the particular vehicle; after receiving the input, the computing device sending a message to the particular vehicle to initiate performance of the particular functional task on the particular vehicle; and after sending the message, the computing device displaying a notification indicative of performing the particular functional task on the particular vehicle.

In another aspect, a computing device is provided. The computing device includes a processor and a non-transitory computer readable medium. The non-transitory computer readable medium stores at least executable instructions. The executable instructions, when executed by the processor, cause the computing device to perform functions. The functions include: repairing a particular vehicle during a repair session, the repair session including: receiving a functional task setup that includes a first identifier and a second identifier, where the first identifier identifies the particular vehicle, and where the second identifier identifies a particular functional task for the computing device to perform on the particular vehicle; determining whether the computing device is available to perform the particular functional task; after determining that the computing device is available to perform the particular functional task, receiving an input to initiate performance of the particular functional task on the particular vehicle; after receiving the input, sending a message to the particular vehicle to initiate performance of the particular functional task on the particular vehicle; and after sending the message, displaying a notification indicative of performing the particular functional task on the particular vehicle.

In another aspect, a non-transitory computer readable medium is provided. The non-transitory computer readable medium is configured to store at least executable instructions. The executable instructions, when executed by a processor of a computing device, cause the computing device to perform functions. The functions include: repairing a particular vehicle during a repair session, the repair session including: receiving a functional task setup that includes a first identifier and a second identifier, where the first identifier identifies the particular vehicle, and where the second identifier identifies a particular functional task for the computing device to perform on the particular vehicle; determining whether the computing device is available to perform the particular functional task; after determining that the computing device is available to perform the particular functional task, receiving an input to initiate performance of the particular functional task on the particular vehicle; after receiving the input, sending a message to the particular vehicle to initiate performance of the particular functional task on the particular vehicle; and after sending the message, displaying a notification indicative of performing the particular functional task on the particular vehicle.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of this disclosure.

BRIEF DESCRIPTION OF THE DRAWINGS

FIG. 6 shows an example display related to verifying operation of injectors of a vehicle in the context of the vehicle repair scenario of FIGS. 4 and 5, in accordance with an embodiment.

DETAILED DESCRIPTION

Outputting Diagnostic Content Based on Capabilities of Diagnostic Devices

A vehicle scan tool is an electronic device, which may be a computing device, that can be used to repair one or more vehicles at least by communicating with the vehicle(s), diagnosing faults in the vehicle(s), performing tests on the vehicle(s), setting one or more states of one or more components of the vehicle(s) (e.g., setting a state of a component to be on, off, or to some other particular state), calibrating one or more components and/or systems of the vehicle(s), and/or programming and/or reprogramming one or more components of the vehicle(s). The vehicle scan tool can provide a user interface to allow a user, such as a technician repairing a vehicle, to control operations of the vehicle scan tool. In some cases, the user interface can provide one or menu menus of options for selecting a particular operation to be performed by the vehicle scan tool.

A vehicle is a mobile machine that can be used to transport a one or more people and/or cargo. A vehicle can be driven or otherwise guided along a path (e.g., a paved road or otherwise) on land, in water, or in the air or outer space. A vehicle can be wheeled, tracked, railed, or skied. A vehicle can be guided by a user within the vehicle or by a user outside of the vehicle by use of a remote control. A vehicle can be guided at least partially autonomously. In the case of an autonomous vehicle, the vehicle can at least sometimes be guided along a path without any person or cargo inside or on the vehicle. A vehicle can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, a farm machine, a van (such as a dry or refrigerated van), a tank trailer, a platform trailer, or an automobile carrier. A vehicle can include or use any appropriate voltage or current source, such as a battery, an alternator, a fuel cell, and the like. A vehicle can include or use any desired drive system or engine. That drive system or engine can include items that use fossil fuels, such as gasoline, natural gas, propane, and the like, electricity, such as that generated by a battery, magneto, fuel cell, solar cell and the like, wind and hybrids or combinations thereof. Example vehicles include, but are not limited to, one or more automobiles, light-duty trucks, heavy-duty trucks, construction equipment, train cars, amphibious vehicles, boats, ships, seacraft, hovercraft, gliders, helicopters, airplanes, and/or aircraft.

Figure 1:
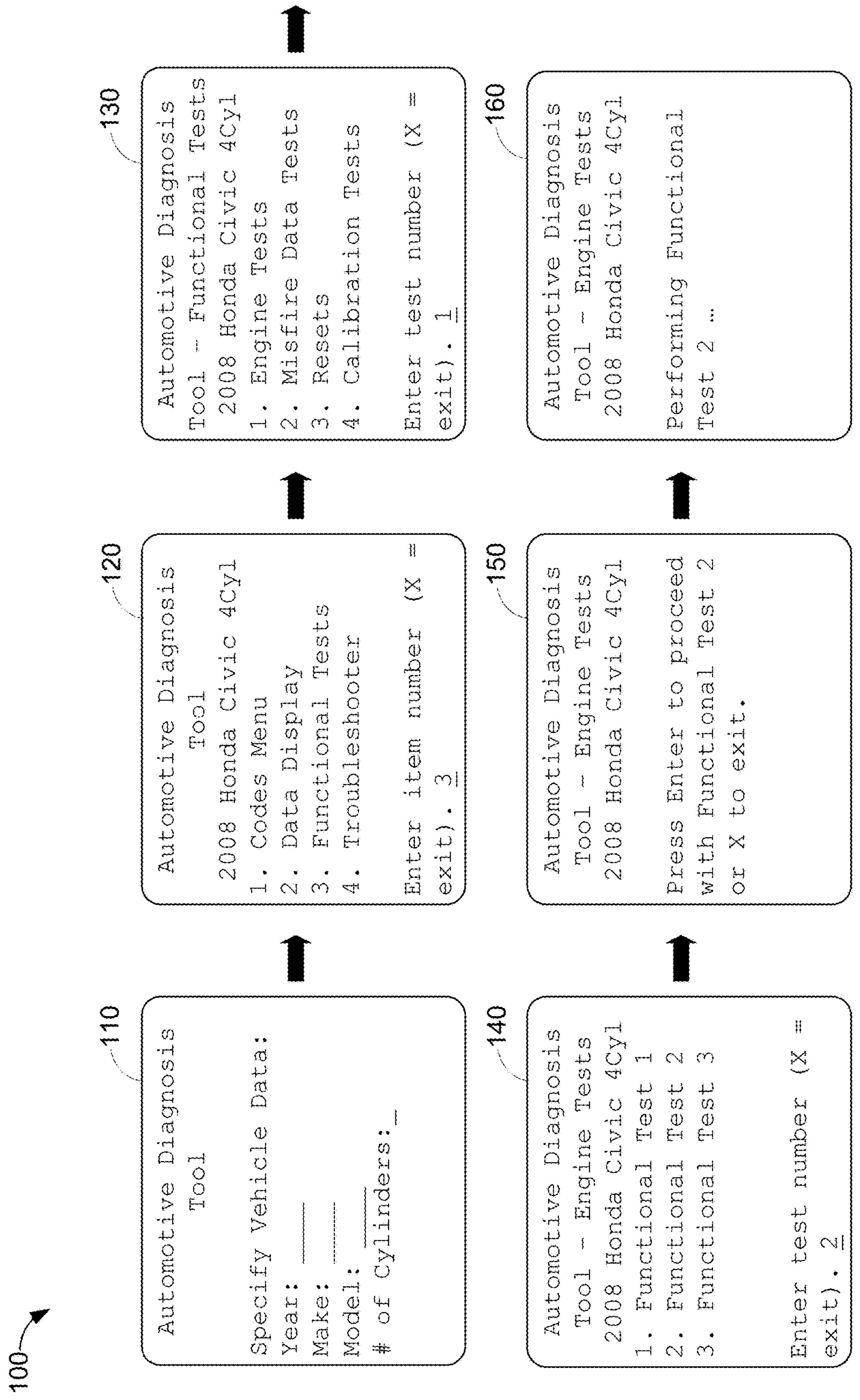
FIG. 1 (Prior Art)
FIG. 1 shows a scenario using a prior art prior art vehicle scan tool.

A vehicle manufacturer can build various quantities of vehicles each calendar year (i.e., January 1$^{st}$ to December 31$^{st}$). In some instances, a vehicle manufacturer defines a model year for a particular vehicle model to be built. The model year can start on a date other than January 1$^{st}$ or can end on a date other than December 31$^{st}$. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a vehicle model with different vehicle options. For example, the particular vehicle model can include vehicles with six-cylinder engines and vehicles with eight-cylinder engines. The vehicle manufacturer or another entity can define vehicle identifying FIG. 1 shows scenario 100 using a prior art vehicle scan tool. Scenario 100 starts with the vehicle scan tool providing data entry screen 110 as shown at upper left of FIG. 1. The data entry screen requests input about a vehicle including a "Year", "Make", "Model", and "# of Cylinders". After providing the requested input about the vehicle, the prior art vehicle scan tool displays screen 120 shown at upper center of FIG. 1. During scenario 100, the input provided for "Year" is 2008, for "Make" is Honda, for "Model" is Civic, and for "# of Cylinders" is 4, as shown at the top of the screen shown at upper center of FIG. 1. Screen 120 also provides a user with a menu having four options: option "1" of "Codes Menu", option "2" of "Data Display", option "3" of "Functional Tests" and option "4" of "Troubleshooter", as well as showing an input provided by the user of "3" to take the functional tests option.

After receiving the input to take the functional tests option, the prior art vehicle scan tool displays screen 130, shown at upper right of FIG. 1. Screen 130 presents another menu for the user having four options related to "Functional Tests": option "1" of "Engine Tests", option "2" of "Misfire Data Tests", option "3" of "Resets" and option "4" of "Calibration Tests", as well as showing an input provided by the user of "1" to take the engine tests option. After receiving the input to take the engine tests option, the prior art vehicle scan tool displays screen 140 shown at lower left of FIG. 1. Screen 140 presents another menu for the user having three options related to "Engine Tests" of "Functional Tests": option "1" of "Functional Test 1", option "2" of "Functional Test 2", option "3" of "Functional Test 3", as well as showing an input provided by the user of "2" to take the functional test 2 option.

After receiving the input to take the functional test 2 option, the prior art vehicle scan tool displays screen 150, shown at lower center of FIG. 1. Screen 150 presents a display requesting an input of "Enter" to "proceed with Functional Test 2" or an input of "X" to "Exit"; i.e., cancel performance of functional test 2. In scenario 100, an enter input is provided to the prior art vehicle scan tool while displaying screen 150. After receiving the enter input, the prior art vehicle scan tool begins performing the test and displays screen 160 shown at lower right of FIG. 1 indicating that performance of functional test 2 has begun. After displaying screen 160, scenario 100 ends.

As illustrated by scenario 100, using menu-based user interfaces for vehicle scan tools such as shown in FIG. 1 can be cumbersome. For example, to perform one test in scenario 100, the user had to enter data about the vehicle and navigate two menus to find the test to be performed before test execution could begin. In other scenarios, prior art vehicle scan tools using menu-based user interfaces can require navigation of more (and perhaps many more) than two menus before carrying out a desired task, such as running a functional test as in scenario 100. Such menu-based user interfaces can lead to user error in selecting options, wasting time in reading menus and providing respective inputs to find and then carry out a desired task, and, in some cases, can lead to user frustration in repetitively navigating menus to perform often-requested tasks.

To address at least these deficiencies in prior art vehicle scan tools, a herein-described vehicle scan tool or other computing device can receive a "functional task setup" to direct the vehicle scan tool to perform a particular task on a particular vehicle. The functional task setup can be provided to the vehicle scan tool via one or more messages from a remote computing device that may be distant or remote from the vehicle scan tool. For example, a user of a vehicle scan tool may use the remote computing device to obtain vehicle service information regarding a vehicle under repair. In repair shops with multiple technicians, the remote computing device could be a common computing device used by the multiple technicians, where the repair shop subscribes to a service to obtain top rate service information from a service provider like Snap-on Incorporated or Mitchell1®. Additionally or alternatively, the remote computing device could be the user's personal smart phone.

In any event, the remote computing can display a page with hypertext (or similar) links related to vehicle repair; e.g., a page displaying information about a repair procedure for vehicular repair with links corresponding to tests and/or other operations to be performed by the vehicle scan tool on a vehicle under repair as part of the repair procedure. Then, in response to selection of a link on the page, the remote computing device or a related computing device, such as a server connected to the computing device, can generate a message with a functional task setup corresponding to the link and send the message with the functional task setup to the vehicle scan tool. Other scenarios for generating and providing functional task setups are possible as well.

The functional task setup can include at least two identifiers: a vehicle identifier identifying the particular vehicle and a task identifier identifying one or more tasks to be performed on the particular vehicle. Examples of the one or more tasks include, but are not limited to, tasks for: transmitting a message to one or more electronic control units (ECUs) of the particular vehicle, performing one or more component tests of one or more components of the particular vehicle, performing one or more functional tests of one or more components of the particular vehicle, performing one or more reset procedures of one or more components of the particular vehicle, calibrating one or more components of the particular vehicle, and reprogramming one or more ECUs of the particular vehicle. In some examples, the particular vehicle can be identified using data such as year/make/model/engine (YMME) data, where the YMME data can include data about a year of manufacture of the particular vehicle, a manufacturer of the particular vehicle, a model of the particular vehicle, and/or data about an engine of the particular vehicle. In other examples, the particular vehicle can be identified using part or all of a vehicle identification number (VIN). Other data can be used to identify a particular vehicle as well or instead.

Upon reception of the functional task setup, the vehicle scan tool can determine whether the vehicle scan tool is available to perform the functional task(s) identified in the functional task setup. For example, the vehicle scan tool can determine whether the vehicle scan tool is already performing another functional task. If the vehicle scan tool is not performing another functional task, then the vehicle scan tool can be available to perform the functional task(s). Otherwise, if the vehicle scan tool is performing another functional task, then the vehicle scan tool may not be available at least until the vehicle scan tool completes the functional task being performed. If the vehicle scan tool is not available, the vehicle scan tool can provide an indication that the functional task setup has been received, that the functional task already being performed has been completed and/or that the vehicle scan tool is now available to perform the functional task(s) identified in the functional task setup. In some cases, the functional task setup can be selected from the vehicle scan tool that displays service information in a non-scan tool mode of the vehicle scan tool.

Once the vehicle scan tool is available to perform the functional task(s) identified in the functional task setup, the vehicle scan tool can generate a display requesting an input to initiate performance of the functional task(s). Such an input can be requested to ensure that the vehicle scan tool is properly connected to the particular vehicle, that it is safe to begin the test, to coordinate actions between the vehicle scan tool and one or more users of the vehicle scan tool, and/or for other reasons.

After receiving the input, the vehicle scan tool can communicate with the particular vehicle to perform the functional task(s) identified in the functional task setup. For example, the vehicle scan tool can send and/or receive one or more messages to and/or from the particular vehicle while performing the functional task(s). While and/or after communicating with the vehicle, the vehicle scan tool can display one or more notifications indicating that the functional task(s) are being performed.

The vehicle scan tool can complete the functional task(s) identified in the functional task setup. After completing the functional task(s), the vehicle scan tool can provide one or more indications that the functional task(s) have been completed. In some examples, the indication(s) that the functional task(s) have been completed can include test results, test status information (e.g., fully completed, partially completed test), and/or other data related to the completed functional task(s). In other examples, the vehicle scan tool can directly or indirectly send a message to one or more other computing devices, where the message represents one or more notifications and is sent instead of (or along with) displaying the notification(s) on the vehicle scan tool. For example, the one or more other computing devices can include the above-mentioned servers and/or the above-mentioned remote computing device. For example, as the remote computing device previously sent the functional task setup, the remote computing device can receive the notification(s) and can generate one or more displays based on the notifications.

The herein-described techniques enable remote operation of the vehicle scan tool from one or more other computing devices. The other computing device(s) can send functional task setups to the vehicle scan tool. Then, the vehicle scan tool can execute one or more functional tasks as indicated by the received functional task setups. As a functional task setup includes a vehicle identifier, the vehicle scan tool can verify that functional task(s) are executed on a vehicle identified by the vehicle identifier and not on some other vehicle, thereby ensuring the functional task(s) are executed on the correct vehicle. Also, by enabling selection of a link, button, or other user-interface element, a user of the other computing device(s) can generate and send functional task setups with minimal effort. In examples where the vehicle scan tool responds to functional task setups with notification messages, the notification message(s) can be used to generate one or more displays of the other computing device(s) sending the functional task setup(s), thereby both providing feedback on the functional task setups and enabling remote repair sessions of vehicles using the other computing device(s). By enabling remote operation and by reducing the number of menus (or related user interface entities) to perform a task, the herein-described techniques, methods, and devices can simplify, ease, and speed use and widen the availability of the vehicle scan tool.

Figure 2:
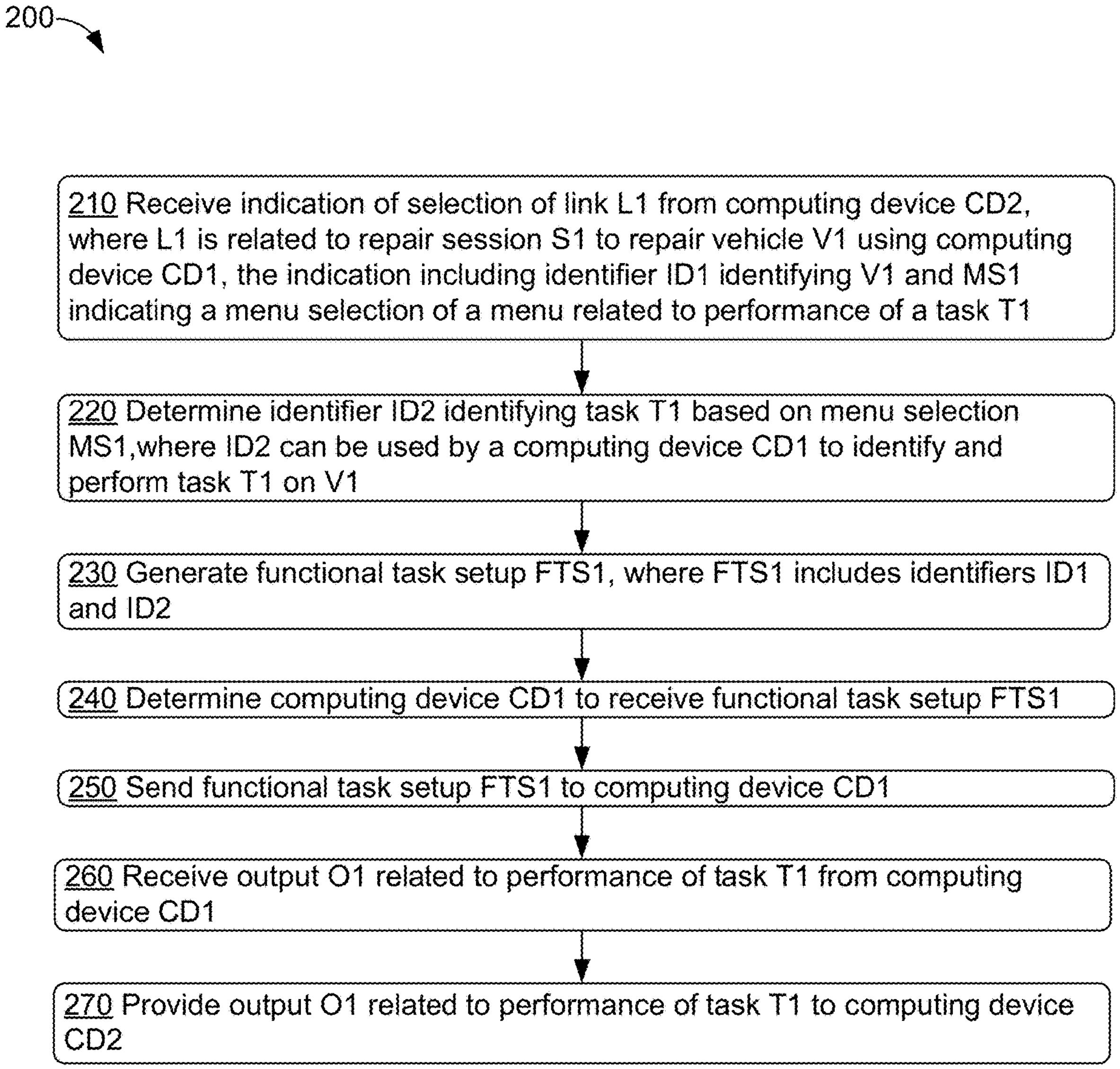
FIG. 2 is a flowchart of a method, in accordance with an embodiment.

FIG. 2 is a flowchart of method 200, in accordance with an embodiment. Part or all of method 200 can be performed by a computing device acting as and/or embodied as a server. The server can be connected to at least two computing devices: a computing device CD1 acting as a vehicle scan tool and a computing device CD2 providing notifications of link selections to the server. Method 200 relates to using computing devices CD1, CD2, and the server to conduct a repair session S1 to repair a repair a vehicle V1. Each of computing devices CD1, CD2, and the server can be computing devices such as computing device 1300 discussed below at least in the context of FIG. 13A.

Method 200 can begin at block 210, where the server can receive an indication of a selection of link L1, where the indication is sent from computing device CD2 to the server. Link L1 can be received in one or more messages (such as one or more link messages) and can be related to a repair session S1 for repairing vehicle V1, where the repair session involves use of computing device CD1 acting as a vehicle scan tool. The indication of a selection of link L1 can include an identifier ID1 identifying vehicle V1 and a menu selection MS1 indicating a menu selection of a menu related to performance of a task T1 to be performed on vehicle V1. In some examples, ID1 can include YMME and/or VIN information identifying vehicle V1. In other examples, the menu selection MS1 can be replaced by a type of identifier related to task T1 other than an identifier of a menu selection; e.g., ID2 discussed below in the context of block 220. In even other examples, link L1 can further include an identifier SCAN_CD and/or related data that identifies a computing device acting as a vehicle scan tool to be used to execute task T1. In still other examples, task T1 can be one or more of: a task of transmitting a message to an ECU of vehicle V1, a task of performing one or more component tests of a particular component of vehicle V1, a task of performing one or more functional tests of a particular component on vehicle V1, a task of performing a reset procedure to the particular component on vehicle V1, a task of calibrating a system including the particular component on vehicle V1, and a task of reprogramming an ECU of vehicle V1.

Table 1 below lists example component tests, functional tests, and resets that can be performed as task T1 for an example vehicle. Other tasks than those mentioned herein can be performed as task T1 as well.

TABLE 1

| Task Name | Task Category |
|---|---|
| 2nd Clutch Switch | Component Test |
| 3rd Clutch Switch | Component Test |
| Accelerator Pedal Position Sensor | Component Test |
| Battery | Component Test |
| Crankshaft Sensor (CKP) | Component Test |
| Clutch Control Solenoids | Component Test |
| Camshaft Position Sensor (CMP) | Component Test |
| Door Ajar Switch | Component Test |
| Door Lock Actuator | Component Test |
| Door Lock Switch | Component Test |
| Engine Coolant Temperature (ECT) Sensor | Component Test |
| Exhaust Gas Recirculation (EGR) Pintle Position Sensor | Component Test |
| Electronic Load Detector | Component Test |
| Engine Oil Pressure (EOP) Sensor | Component Test |
| Fluid Temp Sensor | Component Test |
| Front Oxygen Sensor Bank 1, Sensor 1 (O2 B1-S1) | Component Test |
| Fuel Injector | Component Test |
| Fuel Pump | Component Test |
| Fuel Tank Pressure Sensor | Component Test |
| Headlamps | Component Test |
| Headlight Switch | Component Test |
| High-Mount Stop Lamp | Component Test |
| Horn | Component Test |
| Horn Relay | Component Test |
| Intake Air Temperature (IAT) Sensor | Component Test |
| Ignition Control Module | Component Test |
| Intake Manifold Tuning (IMT) Solenoid | Component Test |
| Input Speed Sensor | Component Test |
| Knock Sensor | Component Test |
| Linear EGR Solenoid | Component Test |
| Manifold Absolute Pressure Sensor | Component Test |
| Manual Trans | Component Test |
| Mass Airflow Sensor | Component Test |
| Output Speed Sensor | Component Test |
| Programmed Fuel Injection (PGM-FI) Main Relay | Component Test |
| Power Window Motor | Component Test |
| Power Window Switch | Component Test |
| Purge Solenoid | Component Test |
| Range Switch | Component Test |
| Rear Oxygen Sensor, Bank 1, Sensor 2 (O2 B1-S2) | Component Test |
| Reverse Lamps | Component Test |
| Shift Solenoid Pack | Component Test |
| Shift Solenoids | Component Test |
| Starter | Component Test |
| Starter Solenoid | Component Test |
| Stop Lamps | Component Test |
| Taillight Assembly | Component Test |
| Throttle Motor | Component Test |
| Throttle Position Sensor | Component Test |
| Vent Solenoid | Component Test |

TABLE 1-continued

| Task Name | Task Category |
|---|---|
| Variable Valve Timing & Lift Electronic Control (VTEC) Solenoid | Component Test |
| Wheel Speed Sensors | Component Test |
| Windshield Washer Pump | Component Test |
| 12 V Battery Fan | Functional Test |
| Air Conditioning (A/C) Clutch | Functional Test |
| Cylinder Air Fuel (AF) | Functional Test |
| EGR Test | Functional Test |
| Electronic Throttle Control System Throttle Actuator Control (ETCS (TAC)) Test | Functional Test |
| Fuel Pump OFF | Functional Test |
| Fuel Pump ON | Functional Test |
| Idle Air Control Valve (IACV) Test | Functional Test |
| Idle Stop Starter Counter Check | Functional Test |
| Idle Stop Starter Counter Forced Write | Functional Test |
| Intake Manifold Tune-in Intake Manifold Runner Control (IMT(IMRC)) Test | Functional Test |
| Injector - One | Functional Test |
| Injectors - All | Functional Test |
| Purge Control Solenoid Canister Purge Valve (PCS(CPV)) Off | Functional Test |
| PCS(CPV) Off, Canister Vent Solenoid (CVS) Off | Functional Test |
| PCS(CPV) Off, CVS On | Functional Test |
| PCS(CPV) On | Functional Test |
| PCS(CPV) On, CVS On | Functional Test |
| PCS(CPV) On/Off, CVS On | Functional Test |
| PCS(CVS) Off | Functional Test |
| PCS(CVS) On | Functional Test |
| Radiator Fan | Functional Test |
| Starter Test | Functional Test |
| Vehicle Timing Control (VTC) Test | Functional Test |
| VTEC Test | Functional Test |
| VTEC + Variable Cylinder Management (VCM) Test | Functional Test |
| CKP Pattern Learning | Reset |
| Crank Pattern Clear | Reset |
| Cruise Control Cancel History | Reset |
| Engine Control Module (ECM)/Powertrain Control Module (PCM) Reset | Reset |
| Electronic Valve Time Control (E-VTC) Learning | Reset |
| Idle Stop Start Counter Clear | Reset |
| Replace ECM/PCM | Reset |
| Throttle Position Learning | Reset |
| Vehicle Identification Number (VIN) Read-Write | Reset |

At block 220, the server can determine an identifier ID2 of task T1 based on menu selection MS1, where ID2 can be used by computing device CD1 to identify task T1 to be performed on vehicle V1. For example, the server can provide menu selection MS1 as an input to a lookup table, data base, or similar data structure to determine ID2 as a resulting output. Other techniques for determining ID2 are possible as well. In some examples, the indication of the election of link L1 can include ID2 instead of, or along with, menu selection MS1—in these examples, the server can omit block 220, as the server would already have determined ID2 at block 210.

At block 230, the server can generate a functional task setup FTS1 that includes identifiers ID1 and ID2 for respectively identifying vehicle V1 and task T1.

At block 240, the server can determine a destination computing device CD1; i.e., a vehicle scan tool, to receive functional task setup FTS1 and subsequently perform task T1 on vehicle V1. To determine CD1, the server can retrieve data identifying computing device CD1; e.g., identifier SCAN_CD, from the link received at block 210. In other examples, the server can maintain repair session data that associates computing device CD2 with the destination computing device CD1, where a particular repair session is identified in the link received at block 210 or otherwise identified; e.g., via a different message and/or other data than provided in the link. Then, by determining that computing device CD2 sent the link received at block 210 and by finding repair session data associated with computing device CD2, the server can determine destination computing device CD1. Other techniques for identifying a destination computing device CD1 are possible as well.

At block 250, the server can send functional task setup FTS1 to destination computing device CD1. Upon reception of functional task setup FTS1, computing device CD1 can use some or all of the procedures of method 300 to perform task T1 on vehicle V1 and provide an output O1 related to the performance of task T1 to the server. Output O1 can be, but is not limited to: a status indicator of task T1 (e.g., task completed, task not completed, task partially completed), data related to task T1 (e.g., data for one or more measurements taken as part of task T1, other data provided by vehicle V1 to computing device Cl during performance of task T1), and/or information about a display related to task T1.

At block 260, the server can receive the output O1 related to the performance of task T1; e.g., receive output O1 from computing device CD1.

At block 270, the server can provide the output O1 to computing device CD2. In some examples, the server can modify output O1 prior to providing the output O1 to computing device CD2; e.g., add, update, and/or delete data from output O1, reformat part or all of output O1, remove message-related data, such as one or more message headers and/or extract output O1 from a message received at block 260 by the server. Upon completion of the procedures of block 270, method 200 can be completed.

Figure 3:
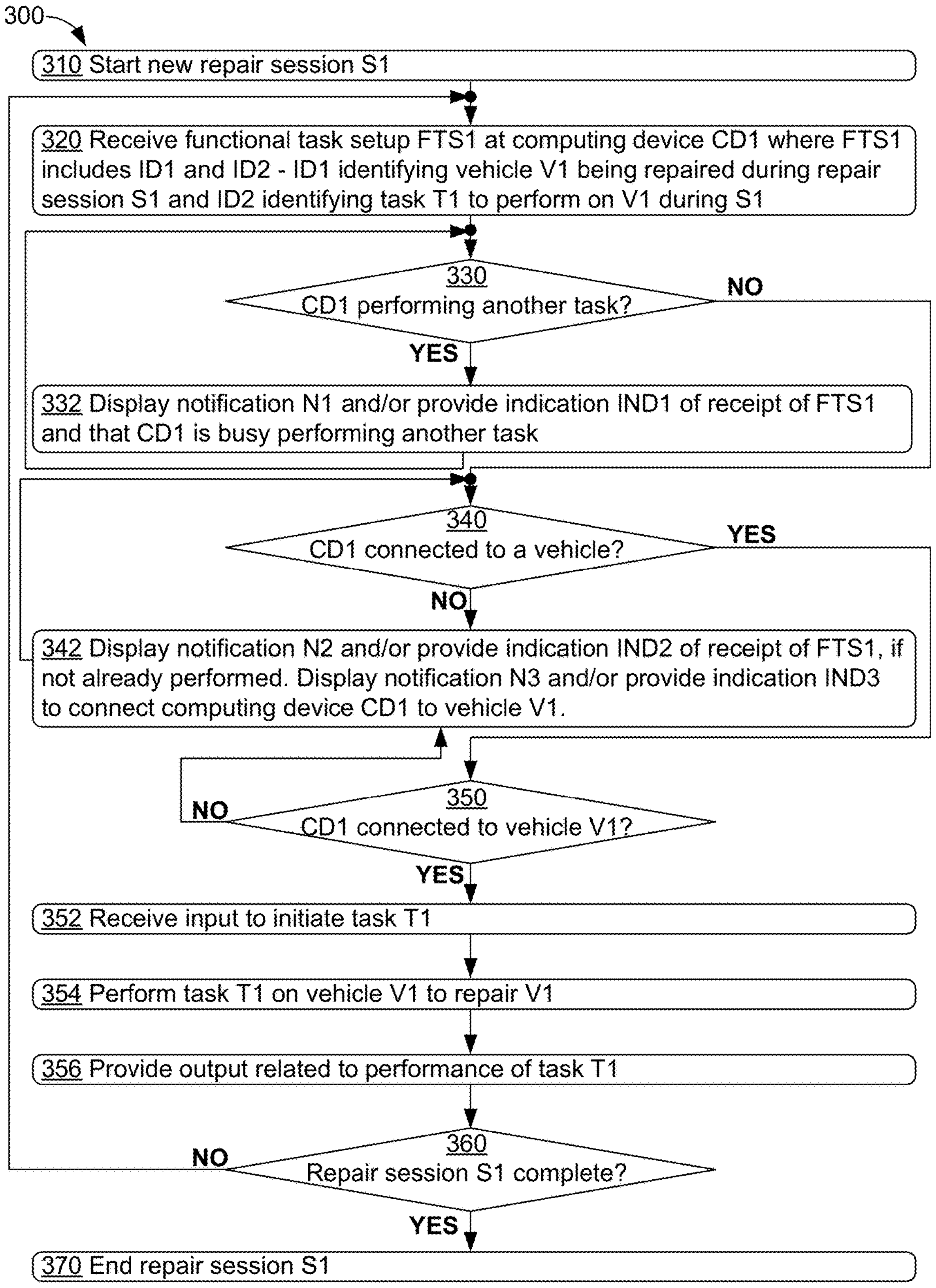
FIG. 3 is a flowchart of another method, in accordance with an embodiment.

FIG. 3 is a flowchart of method 300, in accordance with an embodiment. Part or all of method 300 can be performed by a computing device CD1 acting as and/or embodied as a vehicle scan tool to repair a vehicle V1, such as computing device 1300 discussed below at least in the context of FIG. 13A.

Method 300 can begin at block 310, where computing device CD1 can start a new repair session S1. Starting the new repair session S1 can include computing device CD1 creating and/or initializing data associated with repair session S1.

At block 320, computing device CD1 can receive a functional task setup FTS1, where FTS1 includes identifiers ID1 and ID2. Identifier ID1 can identify a vehicle V1 and identifier ID2 can identify a task T1 to be performed on vehicle V1 using computing device CD1. At least functional task setup FTS1, identifier ID1, identifier ID2, and task T1 are discussed above in more detail at least in the context of method 200.

In some examples, repair session S1 is associated with a vehicle V_S1 and/or repair personnel identifier RP_S1; e.g., a repair session is created when repair personnel login and begin work on a vehicle-repair session S1 can be associated with data identifying the vehicle as V_S1 and/or the repair personnel's user name (or other identifier) as RP_S1. Then, computing device CD1 can compare identifier ID1 identifying V1 with the vehicle V_S1 associated with repair session S1 and/or compare a repair personnel identifier ID_RP in functional task setup FTS1 with repair personnel RP_S1 associated with repair session S1.

If V1 matches V_S1 and/or ID_RP matches RP_S1, then functional task setup FTS1 is also associated with repair session S1. However, if V1 does not match V_S1 and/or ID_RP does not match RP_S1, then functional task setup FTS1 is either associated with a different repair session than repair session S1 or FTS1 is not associated with a repair session being carried out by computing device CD1. Then, computing device CD1 can compare V1 and/or ID_RP with one or more vehicle identifiers associated with other repair sessions than S1 to determine whether V1 and/or ID_RP are associated with another repair session than S1. If V1 and/or ID_RP are associated with a different repair session than S1; e.g., a repair session S2, then computing device CD1 can perform task T1 in the context of the different repair session; e.g., S2. If V1 and/or ID_RP are not associated with any repair session, then computing device CD1 can perform the functionality of block 310 to create a new repair session and associate vehicle V1 and/or repair personnel ID_RP with the new repair session, or reject functional task setup FTS1 as invalid and/or unassociated with a repair session.

At block 330 of method 300, computing device CD1 can determine whether CD1 is already performing another task; e.g., a task T2, that differs from task T1. For example, task T2 can be a task other than T1 that is also related to vehicle repair, such as a task for a different repair session than repair session S1 or a different task for repair session S1. If computing device CD1 is already performing task T2, then computing device CD1 can proceed to block 332. Otherwise, computing device CD1 is not performing another task, and computing device CD1 can proceed to block 340.

At block 332, computing device CD1 can display a notification N1 and/or provide an indication IND1 that computing device CD1 has received functional task setup FTS1 and computing device CD1 that is busy performing another task (e.g., task T2). For example, computing device CD1 can display notification N1 on a screen or other display of CD1. As another example, computing device CD1 can send a message that includes indication IND1 to the server of method 200. Other examples of displaying N1 and/or providing IND1 are possible as well.

Upon completion of block 332, computing device CD1 can proceed to block 330. In some examples, computing device CD1 can proceed to block 330 after waiting for a predetermined amount of time and/or after waiting for completion of task T2; e.g., wait for one or more seconds, wait and check for completion of task T2 at fixed intervals of time; e.g., at 0.5, 1, 2, 5, 15, 30, 60, and/or 120 second intervals.

At block 340, computing device CD1 can determine whether CD1 is connected to a vehicle. In one example, computing device CD1 can send one or more messages, pulses, and/or other outputs over one or more connections, ports, cables, and/or other devices that can be used to connect to a vehicle. In another example, computing device CD1 can send a message via an On-Board Diagnostics (OBD) port/connection, such as a message requesting a vehicle send a VIN or other data using the OBD-II or related protocol. In another example, a connection between computing device and a vehicle can be made by turning the vehicle on (e.g., turning an ignition key to run) and/or starting a vehicle. After sending the output(s), computing device CD1 can receive and/or wait for one or more responses to the sent outputs and use the responses (if any) to determine whether CD1 is connected to a vehicle.

If computing device CD1 determines that CD1 is connected to a vehicle, then computing device CD1 can proceed to block 350. Otherwise, computing device CD1 determines that CD1 is not connected to a vehicle, and computing device CD1 proceed to block 342

At block 342, computing device CD1 can display a notification N2 and/or provide an indication IND2 that computing device CD1 has received functional task setup FTS1, if notification N1 and/or indication IND2 were not displayed and/or provided at block 332. Also, computing device CD1 can display a notification N3 and/or provide an indication IND3 to connect computing device CD1 to vehicle V1. Upon completion of the procedures of block 342, computing device CD1 can proceed to block 340, perhaps after waiting a predetermined amount of time (e.g., 30, 45, 60, 90, or 120 seconds to provide time to connect CD1 to a vehicle V1) and/or after receiving an indication that computing device CD1 is connected to a vehicle.

At block 350, computing device CD1 can determine whether CD1 is connected to vehicle V1. For example, computing device CD1 can send a message via an OBD port/connection, such as a message M1 to the connected vehicle requesting the VIN or other identifying information about the connected vehicle using the OBD-II or related protocol. Then, computing device CD1 can receive a response R1 to message M1 and compare part or all of response R1 with part or all of identifier ID1 to determine whether CD1 is connected to vehicle V1. Other techniques to determine whether CD1 is connected to vehicle V1 are possible as well.

If computing device CD1 is connected to vehicle V1, then computing device CD1 can proceed to block 352. Otherwise, computing device CD1 is not connected to vehicle V1 and computing device CD1 can proceed to block 342.

At block 352, computing device CD1 can receive an input to initiate performance of task T1. For example, computing device CD1 can display a request for input to initiate task T1 on a screen of CD1 or another display. Such an input can provide verification that it is safe to initiate task T1 and/or that vehicle V1 and computing device CD1 are ready for task initiation. In some examples, the procedures of block 352 are omitted.

At block 354, computing device CD1 can perform task T1 as identified by identifier ID2.

At block 356, computing device CD1 can, upon completion of task T1 (or a determination that task T1 cannot be completed), provide an output related to the performance of task T1 to the server, such as output O1 discussed above in the context of block 250 of method 200.

At block 360 of method 300, computing device CD1 can determine whether repair session S1 is complete. For example, functional task setup FTS1 can include an indication whether a repair session is complete and/or data on computing device CD1 can be used to determine whether repair session S1 is complete. If repair session S1 is complete, then computing device CD1 can proceed to block 370. Otherwise, repair session S1 is not complete and computing device CD1 can proceed to block 320.

At block 370, computing device CD1 can end repair session S1. Upon completion of the procedures of block 370, method 300 can be completed.

FIGS. 4, 5, 6, 7, 8, 9, and 10 depict aspects of scenario 400 of repairing two vehicles V1 and V2. Scenario 400 begins with computing device CD1, acting as a vehicle scan tool, being connected to vehicle V2. Also, computing device CD2 receives inputs identifying a task T1 to be performed on vehicle V1 as part of a repair session for vehicle V1—in scenario 400, the inputs are received, in part, by clicking on a link of a display describing a repair procedure being followed to diagnose and repair vehicle V1.

After receiving the inputs identifying a task T1 to be performed on vehicle V1, computing device CD2 can send a link 426 to server 410. Upon reception of link 426, server 410 can use the techniques of method 200 to process link 426. Server 410 can determine computing device CD1 and/or technician TECH1 that are associated with computing device CD2 that sent link 426. Then, server 410 can generate functional task setup 440 with identifiers ID1 and ID2 respectively identifying vehicle V1 and task T1 and send a message with functional task setup 440 to computing device CD1. Upon reception of the message with functional task setup 440, computing device CD1 can use the procedures of method 300 to determine that computing device CD1 is not connected to vehicle V1 (rather, CD1 is connected to vehicle V2) and display a notification of receipt of functional task setup 440 and a notification to have TECH1 connect CD1 to vehicle V1. Computing device CD1 can then be disconnected from vehicle V2 and connected to vehicle V1. After computing device CD1 is connected to vehicle V1, CD1 can receive an input to start task T1 on vehicle V1 and subsequently initiate performance of task T1 on vehicle V1.

Scenario 400 continues with computing device CD2 receiving inputs to perform a task T2 on vehicle V1. After receiving the inputs identifying task T2 to be performed on vehicle V1, computing device CD2 can send a link 510 to server 410. Upon reception of link 510, server 410 can use the techniques of method 200 to process link 510. Server 410 determine computing device CD1 and/or technician TECH1 that are associated with computing device CD2 that sent link 510. Then, server 410 can generate functional task setup 530 with identifiers ID1 and ID3 respectively identifying vehicle V1 and task T3 and send a message with functional task setup 530 to computing device CD1. Upon reception of the message with functional task setup 530, computing device CD1 can use the procedures of method 300 to determine that computing device CD1 is connected to vehicle V1 and display a notification of receipt of functional task setup 530 associated with task T2 and that computing device CD1 is still busy performing another task T1 and provide a related notification to server 410.

Scenario 400 can continue with computing device CD1 completing task T1 on vehicle V1 and obtaining output O1 associated with task T1. After obtaining output O1, computing device CD1 can provide O1 to server 410, and server 410 can provide output O1 to computing device CD2. Computing device CD2 can then generate a display related to output O1.

Scenario 400 can proceed with computing device CD1 displaying a notification requesting input to start task T2 on vehicle V1. After receiving the input to start task T2, CD1 can perform task T2 on vehicle V1 to obtain output O2 associated with task T2. Computing device CD1 can then provide output O2 to server 410, and server 410 can provide output O2 to computing device CD2. Computing device CD2 can then generate a display related to output O2 and scenario 400 can be completed.

Figure 4:
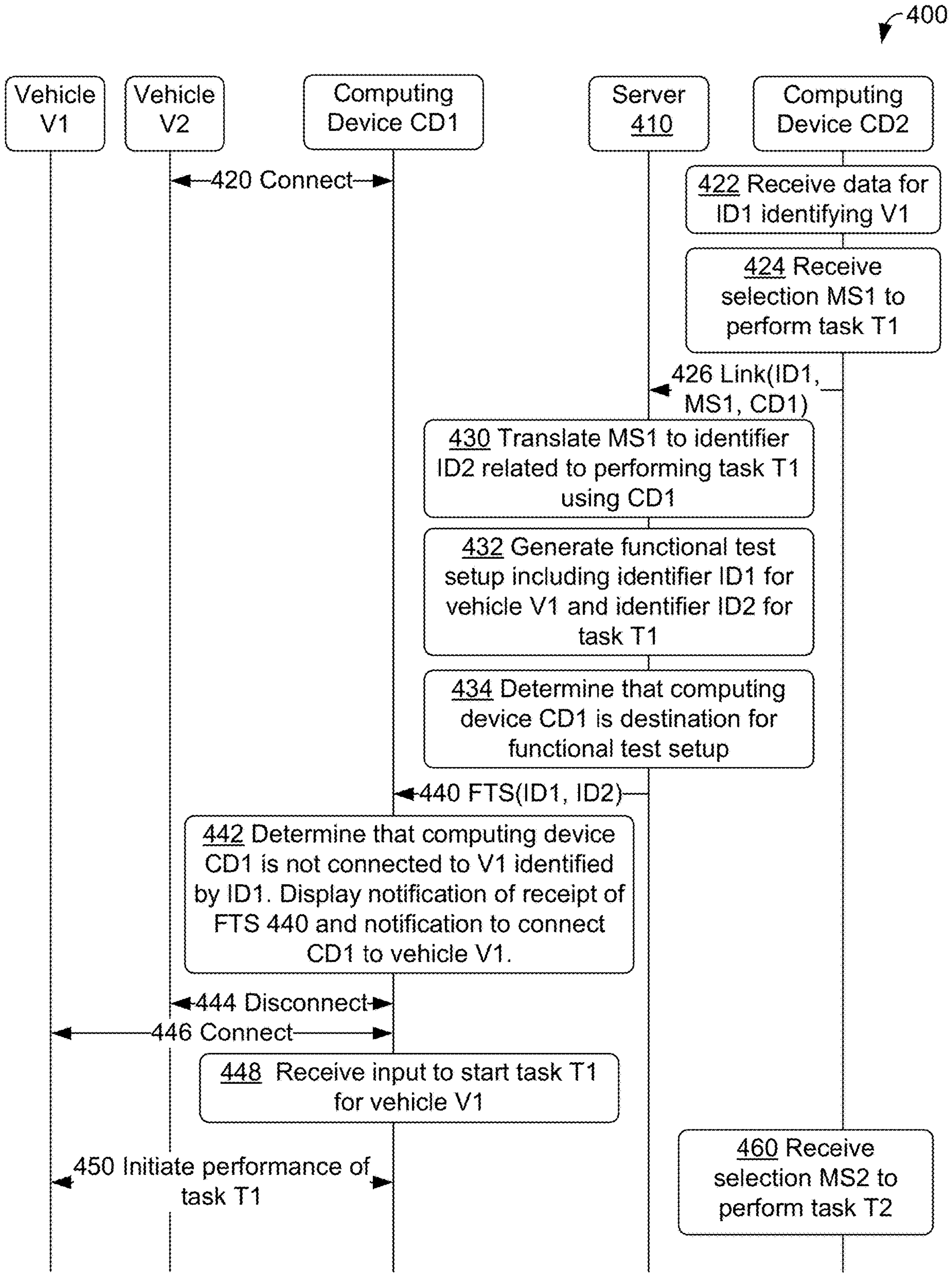
FIGS. 4 and 5 together show a communication flow during a vehicle repair scenario, in accordance with an embodiment.
Figure 5:
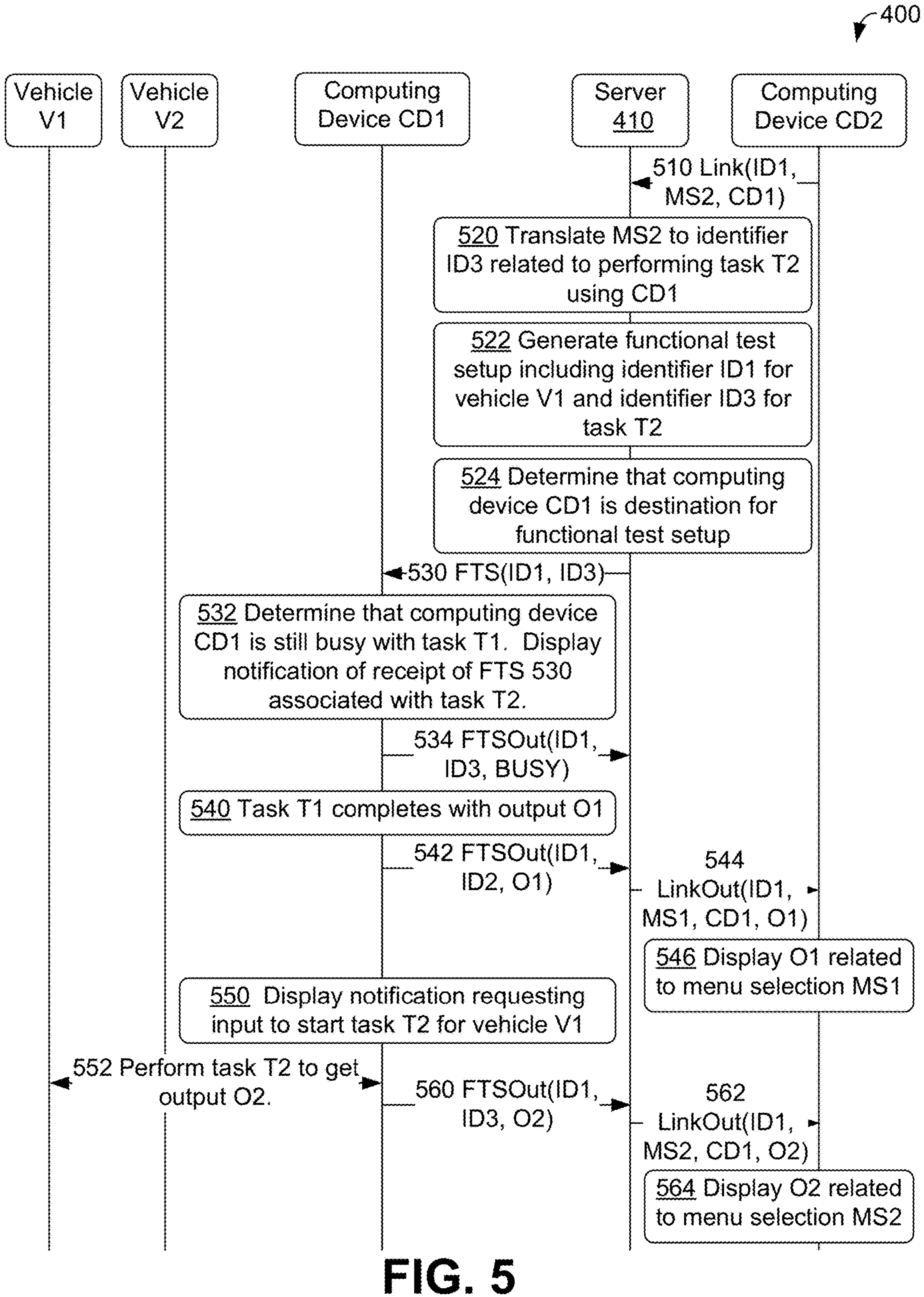

FIGS. 4 and 5 together show a communication flow for scenario 400, in accordance with an embodiment. FIG. 4 illustrates that scenario 400 begins with computing device CD1 being connected to vehicle V2 as indicated using connect message(s) 420. Computing device CD2 receives data for identifier ID1 identifying vehicle V1 and receives a selection MS1 associated with performance of task T1, as shown in respective blocks 422 and 424. In some cases, selection MS1 can be a menu selection; e.g., an identifier for a particular menu of a user interface provided by computing device CD1. In other cases, selection MS1 can identify a function, method, object, address, or other software entity of computing device CD1 to utilize and/or execute to perform task T1. Other types of selections associated with tasks can be used for selection MS1 and/or other herein-described selections (e.g., selection MS2) are possible as well.

FIG. 6 shows display 600 related to verifying operation of injectors of a vehicle generated by computing device CD2 during scenario 400, in accordance with an embodiment. Display 600 is generated by CD2 after performing the procedures of block 422 and before performing the procedures of block 424.

Display 600 indicates that a "menu system" of computing device "CD1" can be used to navigate to a "Injector Balance" screen by first using a "Scanner" menu, then proceeding to a "System" menu, further proceeding to an "Engine" menu, continuing on to a "Functional Tests" menu, which can be used to navigate to the "Injector Balance" screen. According to display 600, computing device "CD1" will "display some instructions for connecting fuel lines and a fuel pressure gauge between CD1 and the vehicle being repaired" after "displaying the Injector Balance Screen". Then, after "[m]ak[ing] sure the vehicle's ignition is ON and its engine is OFF", the "menu system of CD1" can be used to select "Continue" in order "to start injector testing".

Display 600 also describes an alternative to using the menu system of computing device CD1. The alternative involves "[e]nsur[ing] that . . . fuel lines for the vehicle being repaired are connected to CD1", a "fuel pressure gauge is connected to the fuel line of the vehicle", the "vehicle's Ignition is ON", and that the "vehicle's Engine is OFF." After ensuring these items, a user of computing device CD2 can "take" link 610 "to direct CD1 to begin injector testing one injector at a time". That is, repair personnel can use a menu system to navigate through four screens before reaching an "Injector Balance" screen that enables initiation of injector testing to a vehicle connected to computing device CD1, or the repair personnel can take one link—link 610—to initiate injector testing to the vehicle connected to computing device CD1. Repair personnel can save time and avoid potential error by taking link 610 to initiate injector testing in comparison to using computing device CD1's menu system to initiate injector testing.

Display 600 also includes links 620 for individual injector testing of up to eight injectors—links 620 include link 622 to toggle (i.e., test) "Injector #3", link 624 to toggle "Injector #6", and link 626 to toggle "Injector #8". Display 600 also includes button 630 that, when selected, allows the user to end a repair session; e.g., end session S1 in scenario 400. Display 600 further instructs repair personnel to "[c]ompare fuel pressure loss for all injectors to verify injector operation".

At this stage of scenario 400, link 622 is selected using computing device CD2, causing computing device CD2 to generate and send link 426, where MS1 relates to a selection for testing injector #3 of vehicle V1 corresponding to link 622.

FIG. 4 indicates that, after receiving the data for identifier ID1 identifying vehicle V1 and the selection MS1 for testing injector #3, computing device CD2 generates and sends link 426 to server 410 with identifier "ID1" identifying vehicle V1, selection "MS1" related to task T1, and data "CD1" identifying computing device CD1 as a computing device/vehicle scan tool to perform task T1 on vehicle V1.

In scenario 400, identifier ID1 includes YMME and VIN information about vehicle V1 and task T1 involves testing injector #3 as also indicated by selection MS1. In other scenarios, identifier ID1 includes only YMME information about a vehicle, only VIN information about a vehicle. In still other scenarios, identifier ID1 includes other information identifying a vehicle other than YMME and/or VIN information; e.g., one or more names of an owner of a vehicle, one or more identifiers of one or more repair orders or other data associated with the repair session, one or more serial numbers for a vehicle, etc. In even other scenarios, selections MS1 and MS2 can refer to more and/or different respective tasks than T1 and T2.

Server 410 then utilizes the procedures of block 210 of method 200 to receive link 426. After receiving link 426, server 410 utilizes the procedures of block 220 of method 200 to translate received selection MS1 to an identifier ID2 associated with a task T1, as shown at block 430.

Server 410 then utilizes the procedures of block 230 of method 200 to generate a functional task setup that includes identifier ID1 identifying vehicle V1 and identifier ID2 identifying task T1, as shown at block 432. Block 434 indicates that server 410 utilizes the procedures of block 240 of method 200 to determine that computing device CD1 is to receive the functional task setup generated at block 432. In scenario 400, server 410 uses data "CD1" in link 426 that identifies computing device CD1 as the destination for the functional task setup generated at block 432. Server 410 then sends a message with functional task setup 440 with identifiers ID1 and ID2 to computing device CD1.

FIG. 4 indicates that computing device CD1 utilizes the procedures of block 320 of method 300 to receive the message with functional task setup 440. Then, computing device CD1 utilizes the respective procedures of blocks 330 and 340 to determine that computing device CD1 is not performing another task and is connected to a vehicle—as indicated above, at this stage of scenario 400, computing device CD1 is connected to vehicle V2.

As indicated by block 442 of FIG. 4, computing device CD1 utilizes the procedures of block 350 of method 300 to determine that computing device CD1 is connected to vehicle V2. Vehicle V2 is not the vehicle-vehicle V1—identified in functional task setup 440. Block 442 also indicates that that computing device CD1 utilizes the procedures of block 342 of method 300 to display notifications of the receipt of functional task setup (FTS) 440 and that computing device CD1 should be connected to vehicle V1.

Figure 7:
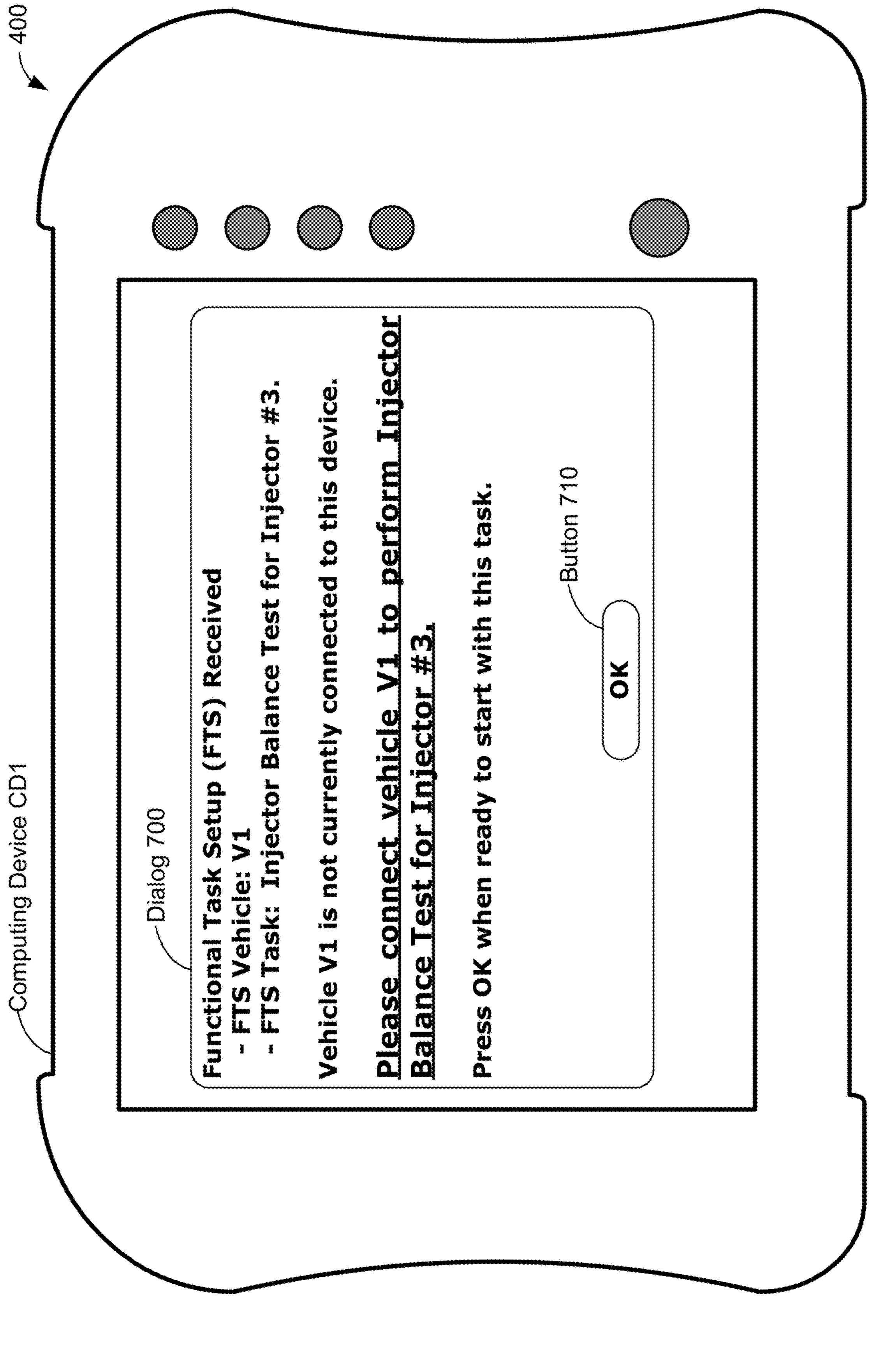
FIG. 7 shows a computing device displaying a request for an input to perform a task during the vehicle repair scenario of FIGS. 4 and 5, in accordance with an embodiment.

FIG. 7 shows computing device CD1 displaying dialog 700, in accordance with an embodiment. Dialog 700, which is displayed as part of the procedures of block 442, includes a notification "Functional Task Setup Received" of the receipt of functional task setup 440 and a notification to "connect vehicle V1" to indicate that computing device CD1 should be connected to vehicle V1. As part of the notification of the receipt of functional task setup 440, dialog 700 also indicates that functional task setup 440 relates to a vehicle "V1" and a task of an "Injector Balance Test for Injector #3"; i.e., task T1. Regarding vehicle V1, dialog 700 indicates that "V1 is not currently connected to" computing device CD1 and requests "connect [ion to] vehicle V1". Dialog 700 also includes button 710 labeled "OK" requests that button 710 be "press[ed] . . . when ready to start with" task T1.

Returning to FIG. 4, scenario 400 continues with repair personnel disconnecting computing device CD1 from vehicle V2, as shown by disconnect message 444. Then, repair personnel connect computing device CD1 to vehicle V1, as shown by connect message 446, and provide an input to start task T1 for vehicle V1, as shown by block 448. In scenario 400, the input to start task T1 for vehicle V1 includes pressing button 710 of dialog 700 discussed above.

Computing device CD1 uses blocks 340, 350, 352 and 354 of method 300 to: determine that computing device CD1 is connected to vehicle V1 that is the vehicle identified in functional task setup 440, receive the input to start task T1, and initiate performance of task T1 on vehicle V1 as part of repairing vehicle V1, as illustrated by message 450 of FIG. 4.

At this stage of scenario 400, link 624 of display 600 shown in FIG. 6 is selected using computing device CD2, and this link selection causes computing device CD2 to generate and send a link, where MS2 is a selection for testing injector #6 of vehicle V1 corresponding to link 624. This link selection is illustrated by block 460 of FIG. 4.

Turning to FIG. 5, scenario 400 continues with computing device CD2 generating and sending link 510 to server 410 with identifier "ID1" identifying vehicle V1, selection "MS2" related to task T2, and data "CD1" identifying computing device CD1 as a computing device/vehicle scan tool to perform task T2 on vehicle V1. In scenario 400, task T2 involves testing injector #6 as also indicated by selection MS2.

Server 410 then utilizes the procedures of block 210 of method 200 to receive link 510. After receiving link 510, server 410 utilizes the procedures of block 220 of method 200 to translate received selection MS2 to an identifier ID3 associated with task T2, as shown at block 520.

Server 410 then utilizes the procedures of block 230 of method 200 to generate a functional task setup that includes identifier ID1 identifying vehicle V1 and identifier ID3 identifying task T2, as shown at block 522. Block 524 indicates that server 410 utilizes the procedures of block 240 of method 200 to determine that computing device CD1 is to receive the functional task setup generated at block 522. In scenario 400, server 410 uses data "CD1" in link 510 that identifies computing device CD1 as the destination for the functional task setup generated at block 522. Server 410 then sends a message with functional task setup 530 with identifiers ID1 and ID2 to computing device CD1.

FIG. 5 indicates that computing device CD1 utilizes the procedures of block 320 of method 300 to receive the message with functional task setup 530. Then, computing device CD1 utilizes the procedures of block 330 to determine that computing device CD1 is still performing task T1, as indicated by block 532. Block 532 also indicates that computing device CD1 uses the procedures of block 332 of method 300 to display a notification of the receipt of functional task setup 530 associated with task T2.

Figure 8:
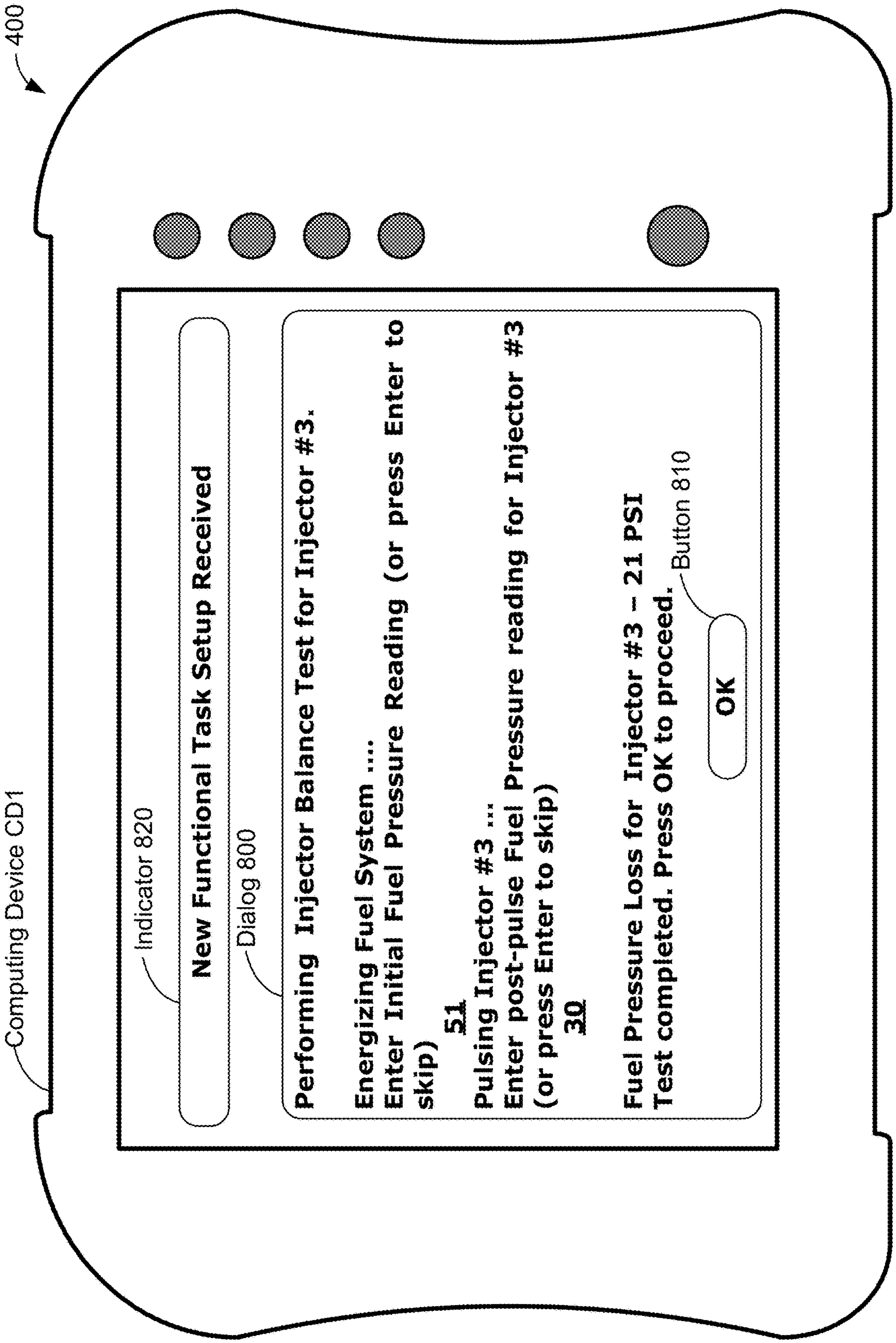
FIG. 8 shows the computing device of FIG. 7 displaying a request for an input to proceed after performing the task of FIG. 7, in accordance with an embodiment.

FIG. 8 shows computing device CD1 displaying indicator 820 to show that a "New Functional Task Setup"; e.g., functional task setup 530 was "Received". After displaying indicator 820 as a notification of the receipt of functional task setup 530, FIG. 5 shows that computing device CD1 uses the procedures of block 356 of method 300 to generate and send functional task setup output (FTSOut) message 534 to server 410. Functional task setup output message 534 indicates that a functional task setup having identifier "ID1" identifying vehicle V1 and identifier "ID3" identifying task T2; e.g., functional task setup 530, is not currently being performed as CD1 is "BUSY" as part of the procedures of block 332 of method 300.

After computing device CD1 sends functional task setup output message 534, computing device CD1 completes task T1 on vehicle V1, as illustrated by block 540 of FIG. 5. After completing task T1, computing device CD1 executes block 356 of method 300 to provide output related to the performance of task T1. In scenario 400, task T1 involves an injector balance test of injector #3 of vehicle V1—this test indicates that an initial fuel pressure reading for injector #3 is 51 pounds per square inch (PSI) and, after pulsing injector #3, a post-pulse fuel pressure reading is 30 PSI for a fuel pressure loss for injector #3 of 21 PSI.

FIG. 5 shows that the output of computing device CD1 related to the performance of task T1 includes sending functional task setup output message 542 to server 410. Functional task setup output message 542 indicates that a functional task setup having identifier "ID1" identifying vehicle V1 and identifier "ID2" identifying task T1; e.g., functional task setup 440, has an output "O1". In scenario 400, output O1 includes data that the fuel pressure loss for injector #3 is 21 PSI.

In scenario 400, the output of computing device CD1 related to the performance of task T1 also includes providing a display of computing device CD1 indicating performance of task T1. FIG. 8 shows computing device CD1 displaying dialog 800 indicating performance of task T1 related to an "Injector Balance Test for Injector #3", where the "Initial Fuel Pressure Reading" is "51" PSI. Then, after "Pulsing Injector #3", dialog 800 indicates a "post-pulse Fuel Pressure reading for Injector #3" is "30" PSI, for a "Fuel Pressure Loss for Injector #3" of "21 PSI". Dialog 800 also indicates that the "Test [is] completed"; i.e., task T1 has been completed, and requests an input e.g., pressing or other selection of "OK" button 810 "to proceed".

FIG. 5 shows that scenario 400 proceeds with server 410 generating and sending link output message 544 to computing device CD2, where link output message 544 has identifiers ID1 and ID2 and output O1 that are the same as in functional task setup output message 542; i.e., server 410 effectively forwards functional task setup output message 542 to computing device CD2 as link output message 544. Upon reception of link output message 544, computing device CD2 displays an output as indicated at block 546. In scenario 400, the output of computing device CD2 displayed at block 546 includes dialog 900.

Figure 9:
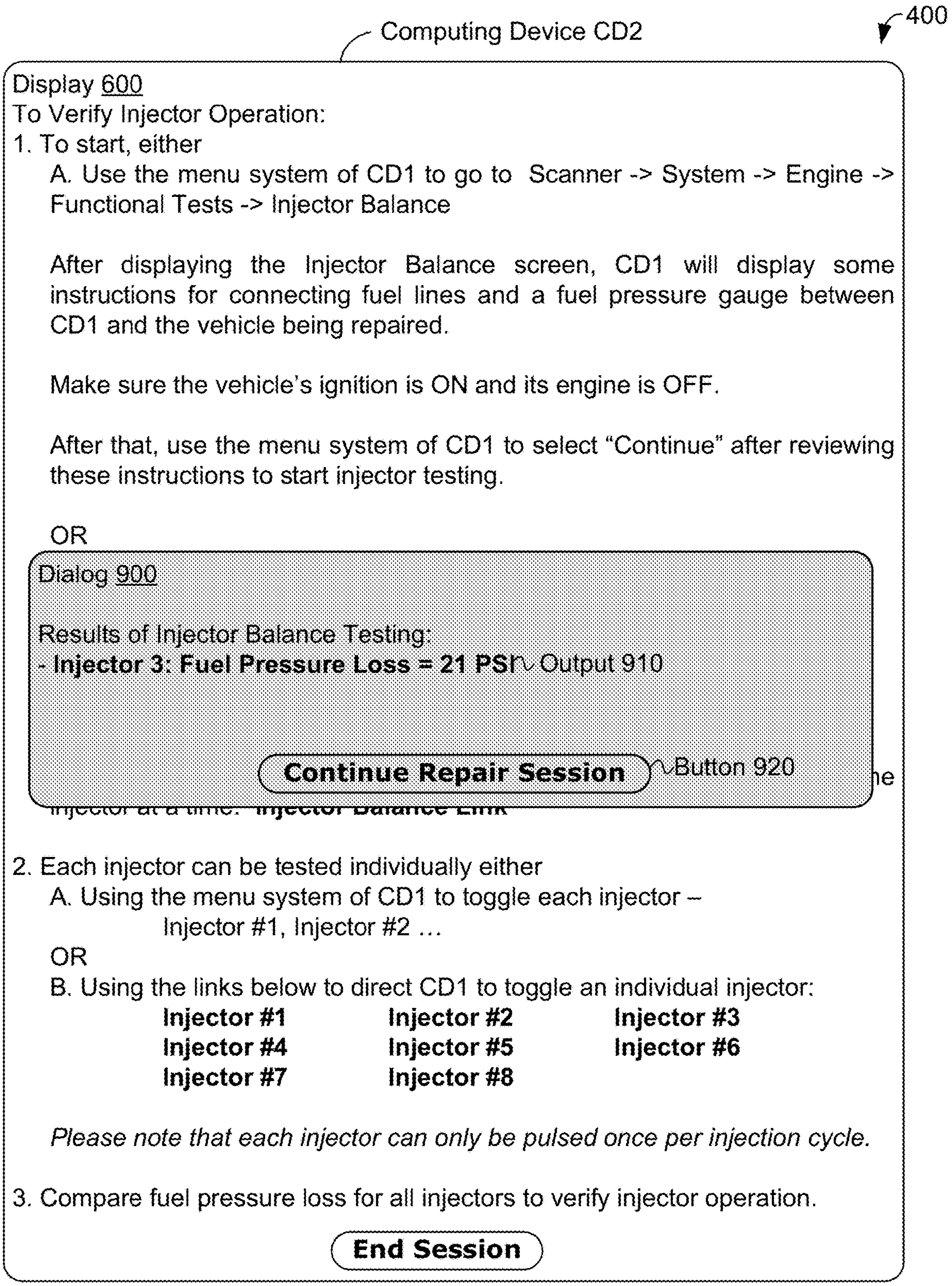
FIG. 9 shows a display with test results for the vehicle repair scenario of FIGS. 4 and 5, in accordance with an embodiment.

FIG. 9 shows that dialog 900 of computing device CD2 includes output 910 from output O1, where dialog 900 and output 910 together state that the "Results of Injector Balance Testing" include results that a "Fuel Pressure Loss" of "Injector 3" is "21 PSI"; that is, dialog 900 displays output 910 that includes test results from testing performed as part of task T1. Dialog 900 also includes button 920 that, when selected, causes computing device CD2 to close dialog 900 and continue with repair session S1.

Scenario 400 continues with computing device CD1 displaying a notification requesting input to start task T2 for vehicle V1 as indicated at block 550 of FIG. 5. In scenario 400, the notification of computing device CD1 includes dialog 1000.

Figure 10:
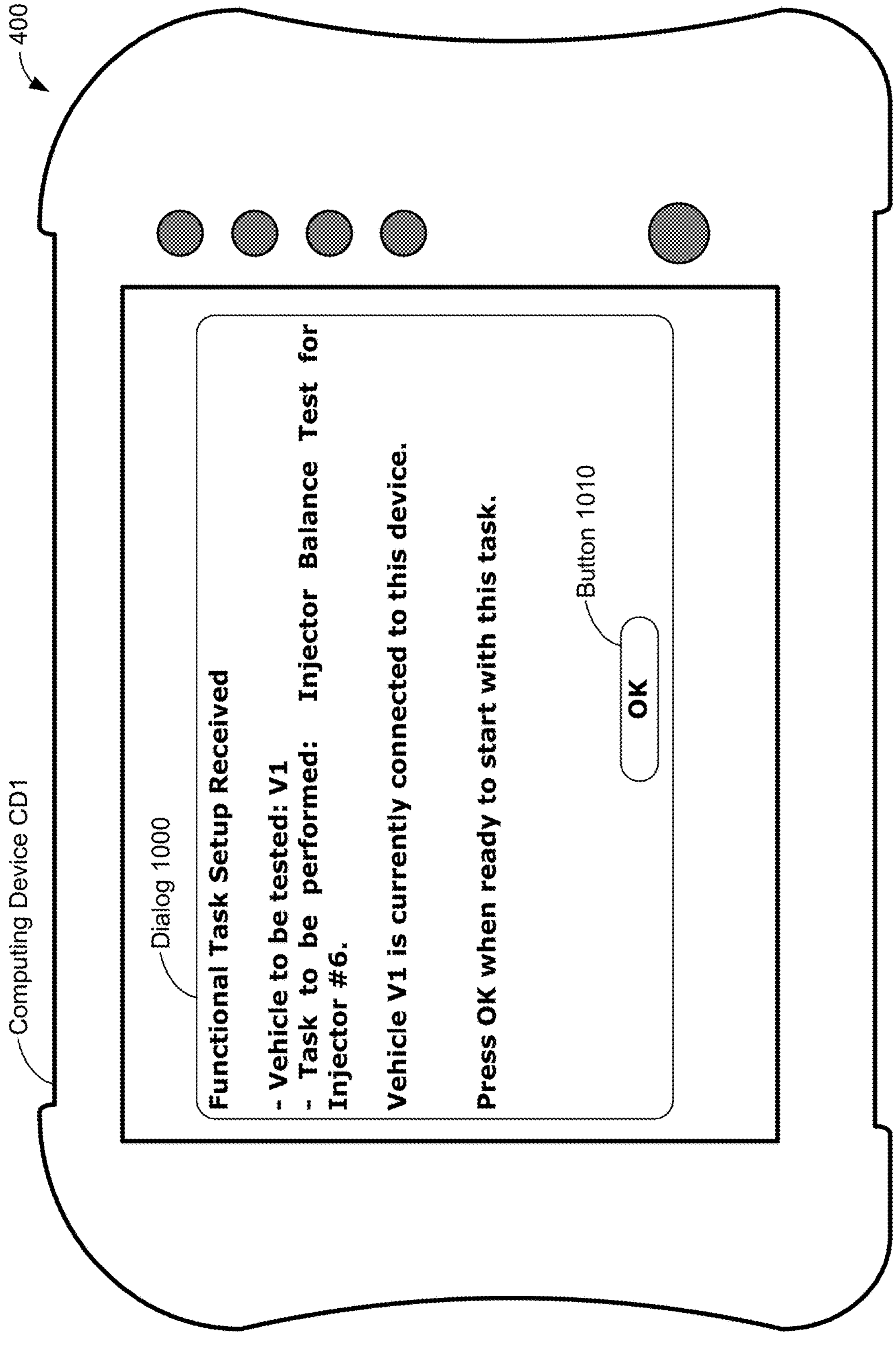
FIG. 10 shows the computing device of FIG. 7 displaying a request for an input to proceed to perform another task during the vehicle repair scenario of FIGS. 4 and 5, in accordance with an embodiment.

FIG. 10 shows computing device CD1 displaying dialog 1000, in accordance with an embodiment. Dialog 700, which is displayed as part of the procedures of block 550, includes a notification "Functional Task Setup Received" of the receipt of functional task setup 530 and a notification that "[v]ehicle V1 is currently connected to this device" which is computing device CD1. As part of the notification of the receipt of functional task setup 530, dialog 1000 also indicates that functional task setup 530 relates to a vehicle "V1" and a task of an "Injector Balance Test for Injector #6"; i.e., task T2. Dialog 1000 also includes button 1010 labeled "OK" requests that button 710 be "press [ed] . . . when ready to start with" task T2.

Returning to FIG. 5, scenario 400 continues with computing device CD1 using the procedures of blocks 340, 350, 352 and 354 of method 300 to: determine that computing device CD1 is connected to vehicle V1 that is the vehicle identified in functional task setup 530, receive the input to start task T2, and perform of task T2 on vehicle V1 as part of repairing vehicle V1, as illustrated by message 552. Then, computing device CD1 uses the procedures of blocks 356 of method 300 to generate and send functional task setup output message 560 to server 410. Functional task setup output message 560 indicates that a functional task setup having identifier "ID1" identifying vehicle V1 and identifier "ID3" identifying task T2; e.g., functional task setup 530, has an output "O2". In scenario 400, output O2 includes data that the fuel pressure loss for injector #6 is 15 PSI.

FIG. 5 shows that scenario 400 proceeds with server 410 generating and sending link output message 562 to computing device CD2, where link output message 562 has identifiers ID1 and ID3 and output O2 that are the same as in functional task setup output message 560; i.e., server 410 effectively forwards functional task setup output message 560 to computing device CD2 as link output message 562. Upon reception of link output message 562, computing device CD2 displays an output as indicated at block 564. In scenario 400, the output of computing device CD2 displayed at block 564 is dialog 1100.

Figure 11:
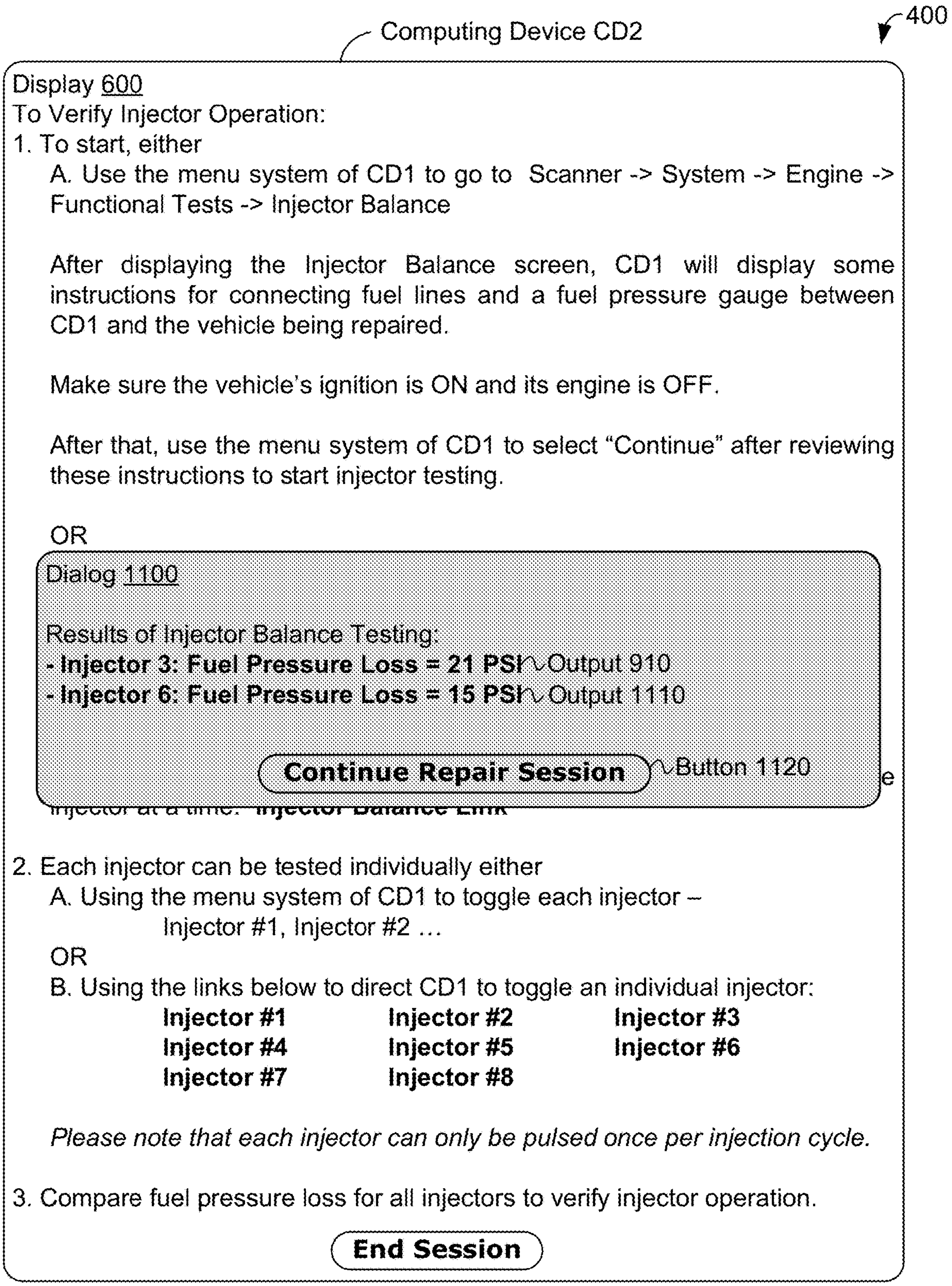
FIG. 11 shows another display with test results for the vehicle repair scenario of FIGS. 4 and 5, in accordance with an embodiment.

In scenario 400, the output of computing device CD1 related to the performance of task T2 also includes providing a display of computing device CD1 indicating performance of task T2. FIG. 11 shows that dialog 1100 of computing device CD2 provides "Results of Injector Balance Testing" that includes previously-received output 910 from output O1 for task T1 and output O2 for task T2. Dialog 1100 and output 910 state that the "Fuel Pressure Loss" of "Injector 3" is "21 PSI". Dialog 1100 and output 1110 from output O2 for task T2 further states that the "Fuel Pressure Loss" of "Injector 6" is "15 PSI". Dialog 1100 also includes button 1120 that, when selected, causes computing device CD2 to close dialog 1100 and continue with repair session S1. After computing device CD2 displays dialog 1100, scenario 400 can be completed.

In other scenarios, more, fewer, and/or different tasks can be performed during a repair session for vehicle V1. In still other scenarios, more, fewer, and/or different tasks can be performed during a repair session for one or more vehicles other than vehicle V1; e.g., vehicle V2. Many other scenarios involving repair sessions for repairing vehicles are possible as well.

Example Computing Network

Figure 12:
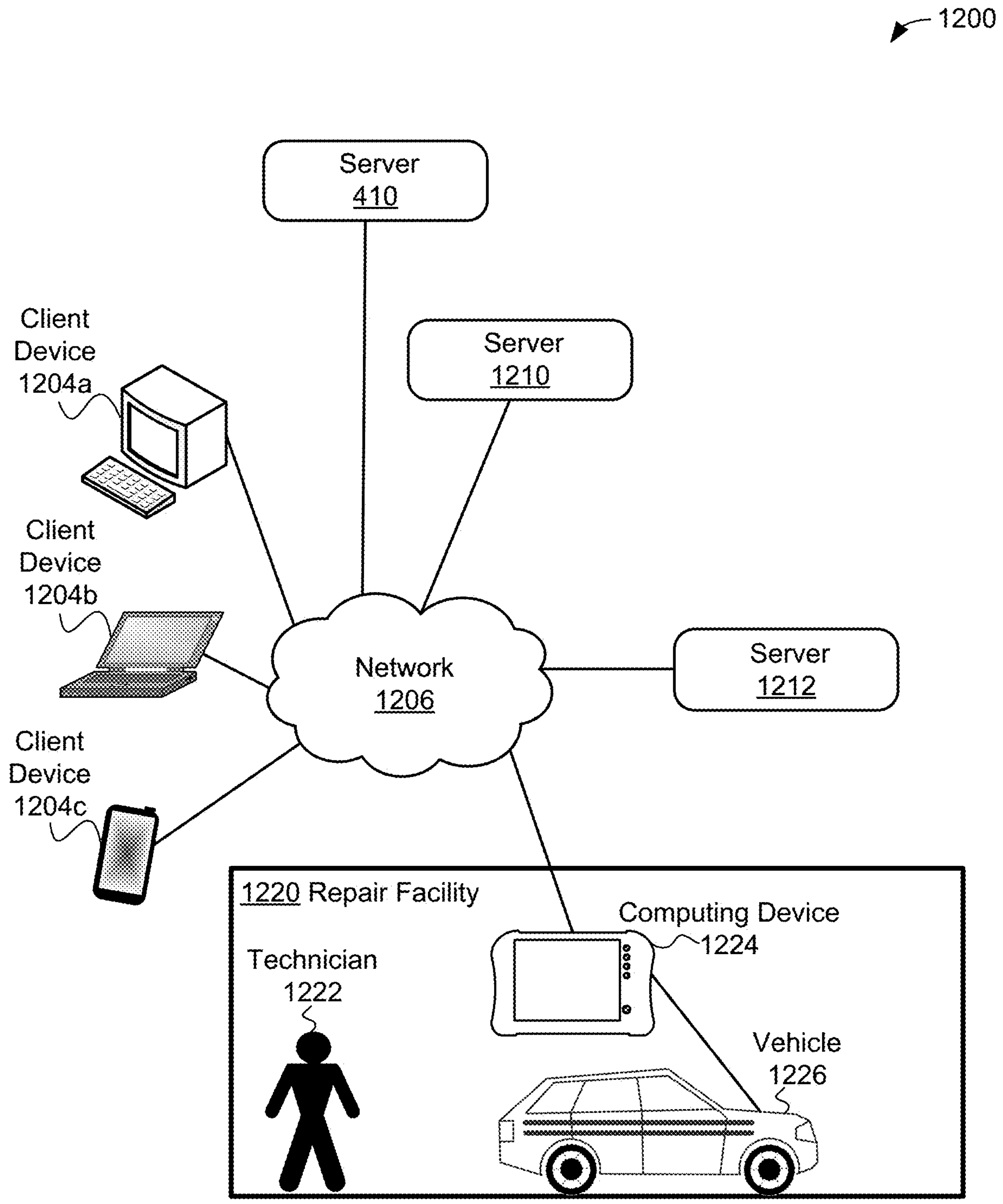
FIG. 12 is a block diagram of an example computing network, in accordance with an embodiment.

FIG. 12 is a block diagram of example computing network 1200 in accordance with an example embodiment. In FIG. 12, servers 410, 1210, and 1212 are configured to communicate, via a network 1206, with computing device 1224 at repair facility 1220 and perhaps with technician 1222, as well as with client devices 1204*a*, 1204*b*, and 1204*c*. As shown in FIG. 12, client devices can include a personal computer 1204*a*, a laptop computer 1204*b*, and a smart-phone 1204*c*, and computing device 1224 can be a vehicle scan tool (or other computing device) configurable to be connected to a vehicle, such as vehicle 1226. More generally, client devices 1204*a*-1204*c* (or any additional client devices) can be any sort of computing device, such as a workstation, network terminal, desktop computer, laptop computer, wireless communication device (e.g., a cell phone or smart phone), and so on.

Network 1206 can correspond to a local area network, a wide area network, a corporate intranet, the public Internet, combinations thereof, or any other type of network(s) configured to provide communication between networked computing devices. In some embodiments, part or all of the communication between networked computing devices can be secured.

Servers 410, 1210, and 1212 can share content and/or provide content at least to computing device 1224 and client devices 1204*a*-1204*c*, where the content can include images, video, audio, computer-readable data, and/or other types of available information directly or indirectly accessible via servers 410, 1210, and 1212. As shown in FIG. 12, servers 410, 1210, and 1212 are not physically at the same location. Alternatively, some or all servers 410, 1210, and 1212 can be co-located, and/or can be accessible via one or more networks that are distinct from network 1206. In other alternatives, some or all of servers 410, 1210, and 1212 can be located at repair facility 1220. Although FIG. 12 shows four client devices (including computing device 1224) and three servers, network 1206 can service more or fewer than four client devices and/or more or fewer than three servers.

Server 410 is discussed above in the context of scenario 400 and at least in the context of FIGS. 4-11. In the context of scenario 400 discussed above in the context of FIGS. 4-11, computing device 1224 can take the role of computing device CD1, one or more of client devices 1204*a*, 1204*b*, and 1204*c* can take the role of computing device CD2, and vehicle 1226 can take the role of vehicle V1 (or vehicle V2). Other uses of server 410, client devices 1204*a*, 1204*b*, 1204*c*, and/or computing device 1224 are possible as well.

Example Computing Device

Figure 13A:
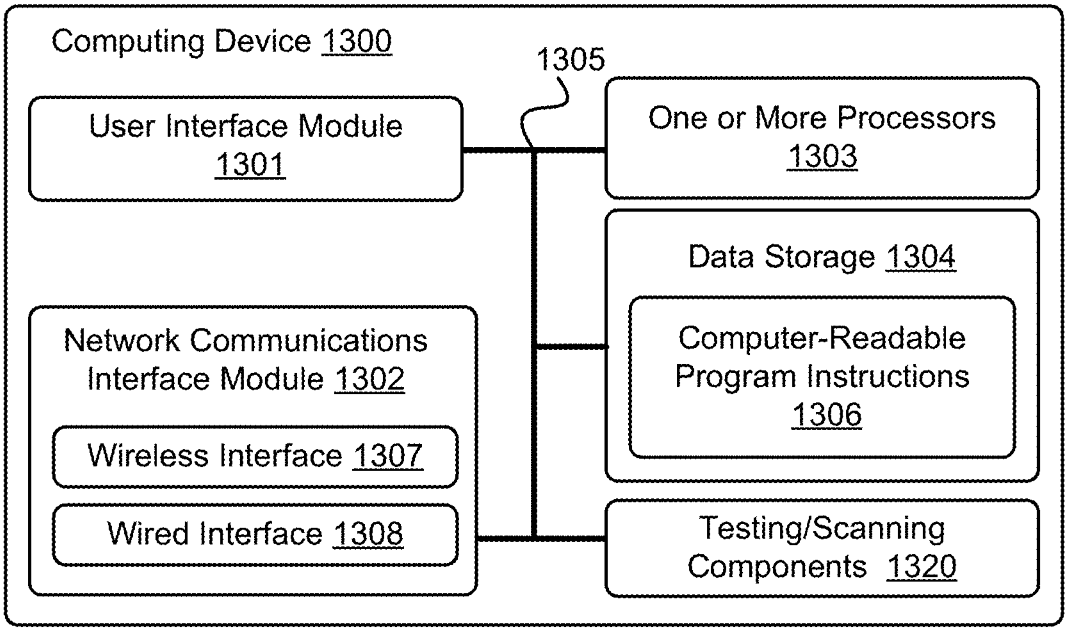
FIG. 13A is a block diagram of an example computing device, in accordance with an embodiment.

FIG. 13A is a block diagram of an example computing device 1300, in accordance with an embodiment. In particular, computing device 1300 can be configured to perform one or more functions of and/or related to a herein-described vehicle scan tool, a herein-described server, a herein-described vehicle, vehicles V1, V2, 1226, computing devices CD1, CD2, 1224, servers 410, 1210, 1212, display 600, dialogs 700, 800, 900, 1000, 1100, indicator 820, client devices 1204*a*, 1204*b*, 1204*c*, and/or network 1206 and/or at least part of one or more of: scenario 100, method 200, method 300, scenario 400, and/or method 1400.

Computing device 1300 can be a desktop computer, laptop or notebook computer, personal data assistant (PDA), mobile phone, embedded processor, touch-enabled device, or any similar device that is equipped with at least one processing unit capable of executing machine-language instructions that implement at least a portion of the herein-described techniques and methods, including, but not limited to, scenario 100, method 200, method 300, scenario 400, and/or method 1400

Computing device 1300 may include a user interface module 1301, a network communication interface module 1302, one or more processors 1303, and data storage 1304, all of which may be linked together via a system bus, network, or other connection mechanism 1305. User interface module 1301 can receive input and/or provide output, perhaps to a user. User interface module 1301 can be configured to send and/or receive data to and/or from user input from input device(s), such as a keyboard, a keypad, a touch screen (such as a projected capacitive touch screen), a computer mouse, a track ball, a joystick, and/or other similar devices configured to receive input from a user of computing device 1300.

User interface module 1301 can be configured to generate and/or provide visible output via one or more output display devices, such as cathode ray tubes (CRTs), liquid crystal displays (LCDs), plasma devices, light emitting diodes (LEDs), displays using digital light processing (DLP) technology, printers, light bulbs, monitors, touch screens, and/or other similar devices capable of displaying graphical, textual, and/or numerical information to a user of computing device 1300. User interface module 1301 can also be configured to generate and/or provide audible output(s) via one or more audio output devices, such as speakers, speaker jacks, audio output ports, earphones, and/or other similar devices configured to convey sound and/or audible information to a user of computing device 1300. User interface module 1301 can further be configured to generate and/or provide haptic output(s) via one or more haptic output devices, such as vibration devices and/or other devices configured to convey touch-related and/or haptic information to a user of computing device 1300.

Network communication interface module 1302 can be configured to send and receive data over wireless interface 1307 and/or wired interface 1308 via a network, such as network 1206. Wireless interface 1307, if present, can utilize an air interface, such as a Bluetooth®, Wi-Fi®, ZigBee®, and/or WiMAX™ interface to a data network, such as a wide area network (WAN), a local area network (LAN), one or more public data networks (e.g., the Internet), one or more private data networks, or any combination of public and private data networks. Wired interface(s) 1308, if present, can comprise a wire, cable, fiber-optic link and/or similar physical connection(s) to a data network, such as a WAN, LAN, one or more public data networks, one or more private data networks, or any combination of such networks. Network communication interface module 1302 can be configured to communicate with one or more vehicles, such as vehicle V1, V2, and/or 1226, using one or more communications interfaces; e.g., an OBD-II protocol interface, a Bluetooth® interface, a Wi-Fi® interface, a ZigBee® interface and/or a vehicle data message (VDM) protocol. A VDM protocol can include a Society of Automotive Engineers (SAE) J1850 (PWM or VPW) VDM protocol, an International Organization of Standardization (ISO) 15764-4 controller area network (CAN) VDM protocol, an ISO 9141-2 K-Line VDM protocol, an ISO 14230-4 KWP2000 K-Line VDM protocol, or some other protocol presently defined for performing communications within a vehicle.

In some embodiments, network communication interface module 1302 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as Cyclic Redundancy Check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), an Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well as or in addition to those listed herein to secure (and then decrypt/decode) communications. In some cases, such communications can also, or instead, be compressed communications; in these cases, network communication interface module 1302 can be configured to compress uncompressed communications and/or decompress compressed communications.

One or more processors 1303 can include one or more central processing units, computer processors, mobile processors, digital signal processors (DSPs), graphics processors, graphics processing units (GPUs), microprocessors, computer chips, special purpose processors, neural network processors, embedded processors and/or other processing units configured to execute machine-language instructions and process data. Processor(s) 1303 can be configured to execute computer-readable program instructions 1306 that are contained in data storage 1304 and/or other instructions as described herein. In some examples, at least one processor of one or more processors 1303 can include an application specific integrated circuit (ASIC) processor.

In some contexts, an embedded processor refers to a processor with a dedicated function or functions within a larger electronic, mechanical, pneumatic, and/or hydraulic device, and is contrasted with a general purpose computer. In some implementations, the embedded processor can execute an operating system, such as a real-time operating system (RTOS). As an example, the RTOS can include the SMX® RTOS developed by Micro Digital, Inc., such that the processor(s) 1303 can, but need not necessarily, include (a) an advanced RISC (reduced instruction set computer) machine (ARM) processor (e.g., an AT91SAM4E ARM processor provided by the Atmel Corporation, San Jose, California), or (b) a COLDFIRE® processor (e.g., a 52259 processor) provided by NXP Semiconductors N.V., Eindhoven, Netherlands.

Data storage 1304 can include one or more physical and/or non-transitory storage devices, such as read-only memory (ROM), random access memory (RAM), removable-disk-drive memory, hard-disk memory, magnetic-tape memory, flash memory, and/or other storage devices. Data storage 1304 can include one or more physical and/or non-transitory storage devices with at least enough combined storage capacity to contain computer-readable program instructions 1306 and any associated/related data and data structures.

In embodiments of the disclosure in which a computer software product is used, the product may be non-transitory and store instructions on one or more physical media and/or devices, such as a DVD, a solid state drive, a hard drive, or any other non-transitory computer-readable media or storage devices disclosed herein. Alternatively, the product may be transitory and in the form of instructions provided over a connection such as a network connection which is linked to a network such as the Internet.

Computer-readable program instructions 1306 and any data structures contained in data storage 1304 include computer-readable program instructions executable by processor(s) 1303 and any storage required, respectively, to perform at least part of herein-described of the herein-described techniques and methods Testing/scanning components 1320 can include components for scanning, testing, and/or repairing a vehicle. These components can include, but are not limited to, one or more OBD-II (i.e., Diagnostic Test Code/Parameter ID (DTC/PID)) scanners, electronic measuring components, test leads, data ports, power supplies, digital oscilloscopes, digital ammeters, digital voltmeters, digital ohmmeters, and digital multi-meters.

Example Networked Computing Centers

Figure 13B:
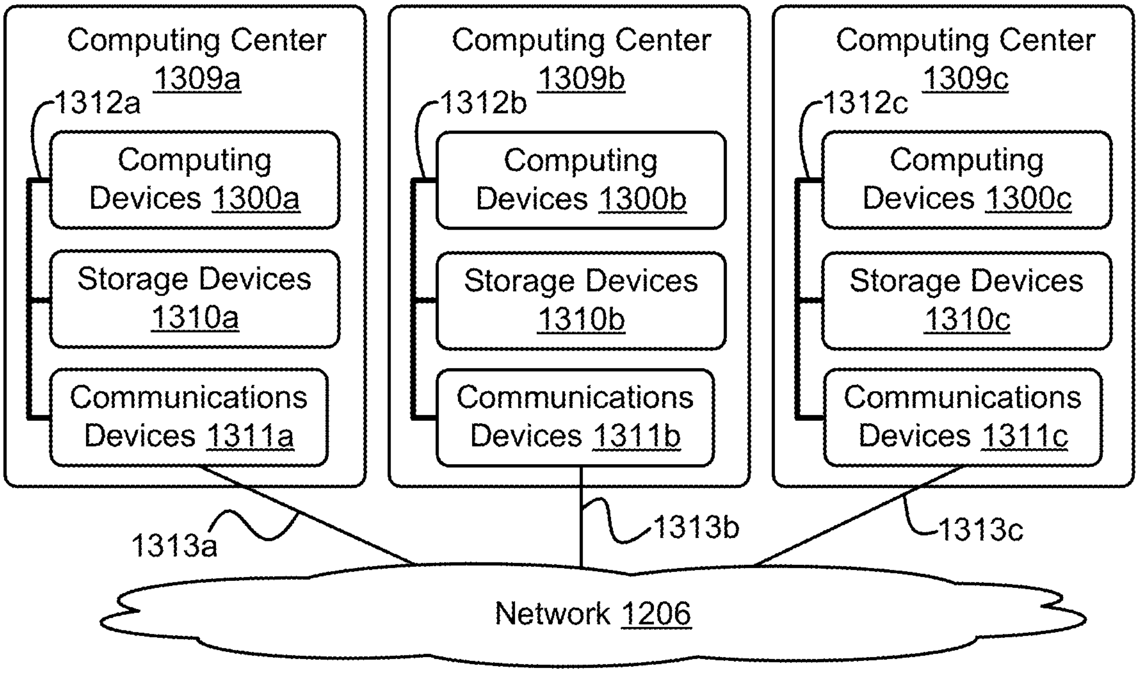
FIG. 13B depicts an example network of computing centers, in accordance with an embodiment.

FIG. 13B depicts a network 1206 of computing centers 1309*a*, 1309*b*, 1309*c* in accordance with an example embodiment. The herein-described techniques can be embodied in software and related data, some or all of which can be stored on one or more cloud-based devices that store program logic and/or data of cloud-based applications and/or services. In some embodiments, a herein-described computing device and/or server can be a single computing device residing in a single computing center. In other embodiments, a herein-described computing device and/or server can include multiple computing devices in a single computing center, or even multiple computing devices located in multiple computing centers located in diverse geographic locations.

In some embodiments, data and/or software for a herein-described computing device and/or server can be encoded as computer readable information stored in computer readable media and/or non-transitory computer readable storage media and accessible by a herein-described computing device and/or client device. In some embodiments, data and/or software for a herein-described computing device and/or server can be stored on a single disk drive or other non-transitory and/or tangible storage media, or can be implemented on multiple disk drives or other non-transitory and/or tangible storage media located at one or more diverse geographic locations. FIG. 13B depicts a cloud-based server system in accordance with an example embodiment.

In FIG. 13B, the functions of a herein-described computing device and/or server can be distributed among three computing centers 1309*a*, 1309*b*, and 1308*c*. Computing center 1309*a* can include one or more computing devices 1300*a*, storage devices 1310*a*, and communication devices 1311*a* (e.g., router(s), hub(s), switch(es)) connected by local network 1312*a*. Similarly, computing center 1309*b* can include one or more computing devices 1300*b*, storage devices 1310*b*, and communication devices 1311*b* connected by local network 1312*b*. Likewise, computing center 1309*c* can include one or more computing devices 1300*c*, storage devices 1310*c*, and communication devices 1311*c* connected by local network 1312*c*.

In some embodiments, each of computing centers 1309*a*, 1309*b*, and 1309*c* can have equal numbers of computing, storage, and communication devices. In other embodiments, however, each computing center can have different numbers of computing, storage, and/or communication devices. The number of computing, storage, and communication devices in each computing center can depend on the computing task or tasks assigned to each computing center.

In computing center 1309*a*, for example, computing devices 1300*a* can be configured to perform various computing tasks of a herein-described computing device and/or server. In one embodiment, the various functionalities of a herein-described computing device and/or server can be distributed among one or more of computing devices 1300*a*, 1300*b*, and 1300*c*. Computing devices 1300*b* and 1300*c* in computing centers 1309*b* and 1309*c* can be configured similarly to computing devices 1300*a* in computing center 1309*a*. On the other hand, in some embodiments, computing devices 1300*a*, 1300*b*, and 1300*c* can be configured to perform different functions.

In some embodiments, computing tasks and stored data associated with a herein-described computing device and/or server can be distributed across computing devices 1300*a*, 1300*b*, and 1300*c* based at least in part on the processing requirements of a herein-described computing device and/or server, the processing capabilities of computing devices 1300*a*, 1300*b*, and 1300*c*, the latency of the network links between the computing devices in each computing center and between the computing centers themselves, and/or other factors that can contribute to the cost, speed, fault-tolerance, resiliency, efficiency, and/or other design goals of the overall system architecture.

The storage devices 1310*a*, 1310*b*, and 1310*c* of computing centers 1309*a*, 1309*b*, and 1309*c* can be data storage arrays that include disk array controllers configured to manage read and write access to groups of hard disk drives. The disk array controllers, alone or in conjunction with their respective computing devices, can also be configured to manage backup or redundant copies of the data stored in the storage devices to protect against disk drive or other storage device failures and/or network failures that prevent one or more computing devices from accessing one or more storage devices.

Similar to the manner in which the functions of a herein-described computing device and/or server can be distributed across computing devices 1300*a*, 1300*b*, and 1300*c* of computing centers 1309*a*, 1309*b*, and 1309*c*, various active portions and/or backup portions of these components can be distributed across storage devices 1310*a*, 1310*b*, and 1310*c*. For example, some storage devices can be configured to store one portion of the data and/or software of a herein-described computing device and/or server, while other storage devices can store other, separate portions of the data and/or software of a herein-described computing device and/or server. Additionally, some storage devices can be configured to store backup versions of data and/or software stored in other storage devices.

Communication devices 1311*a*, 1311*b*, and 1311*c* can include networking equipment configured to provide internal and external communications for computing centers 1309*a*, 1309*b*, 1309*c*. For example, communication devices 1311*a* in computing center 1309*a* can include one or more internet switching and routing devices configured to provide (i) local area network communications between computing devices 1300*a* and storage devices 1310*a* via local network 1312*a*, and (ii) wide area network communications between computing center 1309*a* and the computing centers 1309*b* and 1309*c* via connection 1313*a* to network 1206. Communication devices 1311*b* and 1311*c* can include network equipment similar to communication devices 1311*a*, and communication devices 1311*b* and 1311*c* can perform similar networking functions for computing centers 1309*b* and 1309*b* that communication devices 1311*a* perform for computing center 1309*a*.

In some embodiments, the configuration of communication devices 1311*a*, 1311*b*, and 1311*c* can be based at least in part on the communication requirements of the computing devices and storage devices, the communications capabilities of network equipment in the communication devices 1311*a*, 1311*b*, and 1311*c*, the latency and throughput of local networks 1312*a*, 1312*b*, 1312*c*, the latency, throughput, and cost of connections 1313*a*, 1313*b*, and 1313*c*, and/or other factors that can contribute to the cost, speed, throughput, fault-tolerance, resiliency, efficiency and/or other design goals for computing centers 1309*a*, 1309*b*, 1309*c*.

Example Methods of Operation

Figure 14:
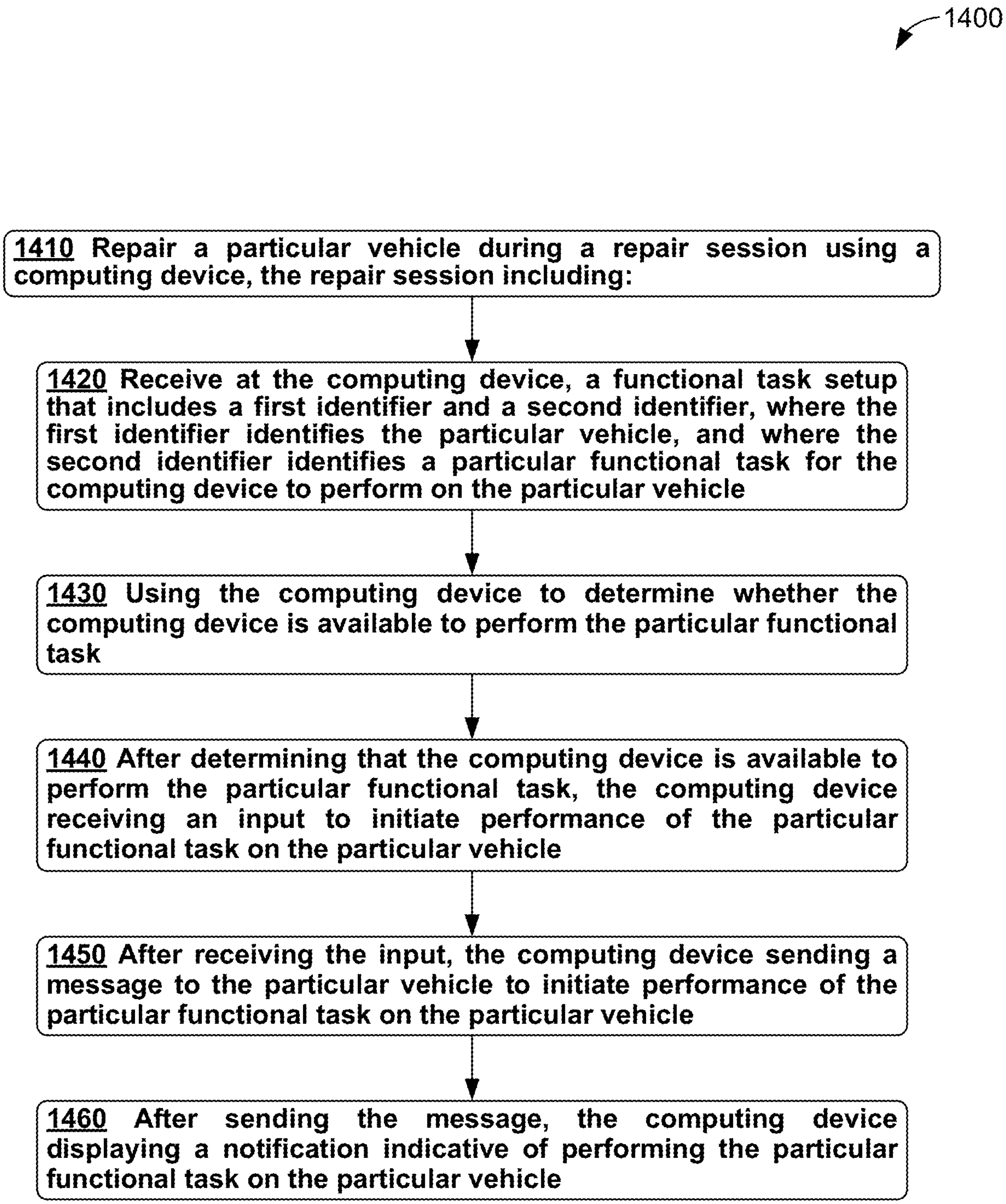
FIG. 14 is a flow chart of another method, in accordance with an embodiment.

FIG. 14 is a flow chart of method 1400, in accordance with an embodiment. Method 1400 can be carried out by a computing device, such as computing device 1300 discussed above in the context of FIG. 13A. In some embodiments, the computing device can act as and/or embody a vehicle scan tool that carries out part or all of method 1400.

Method 1400 can begin at block 1410 with the computing device can be used to repair a particular vehicle during a repair session, such as discussed above in the context of at least FIGS. 3-11. The repair session can include at least the procedures of blocks 1420, 1430, 1440, 1450 and 1460.

At block 1420, the computing device can receive a functional task setup that includes a first identifier and a second identifier, where the first identifier identifies the particular vehicle, and where the second identifier identifies a particular functional task for the computing device to perform on the particular vehicle, such as discussed above in the context of at least FIGS. 3-11.

In some embodiments, the first identifier includes information related to a year of manufacture of the particular vehicle, a manufacturer of the particular vehicle, and a model of the particular vehicle, such as discussed above in the context of at least FIGS. 3 and 4. In other embodiments, the first identifier includes information related to a VIN of the particular vehicle, such as discussed above in the context of at least FIGS. 3 and 4. In even other embodiments, the particular functional task includes: a task of transmitting a message to an ECU of the particular vehicle, a task of performing one or more component tests of a particular component of the particular vehicle, a task of performing one or more functional tests of a particular component on the particular vehicle, a task of performing a reset procedure to the particular component on the particular vehicle, a task of calibrating a system including the particular component on the particular vehicle, or a task of reprogramming an ECU of the particular vehicle, such as discussed above in the context of at least FIGS. 2 and 3.

At block 1430, the computing device can be used to determine whether the computing device is available to perform the particular functional task, such as discussed above in the context of at least FIGS. 3-11.

In some embodiments, determining whether the computing device is available to perform the particular functional task includes determining whether the computing device is already performing another functional task, such as discussed above in the context of at least FIGS. 3-11. In particular of these embodiments, determining whether the computing device is available to perform the particular functional task includes: after determining that the computing device is already performing another functional task, providing an output of the computing device indicating receipt of the functional task setup, such as discussed above in the context of at least FIGS. 3-11. In particular of these embodiments, determining whether the computing device is available to perform the particular functional task includes: after determining that the computing device is not already performing another functional task, providing an output of the computing device requesting the input to initiate performance of the particular functional task on the particular vehicle, such as discussed above in the context of at least FIGS. 3-11.

In other embodiments, determining whether the computing device is available to perform the particular functional task includes: determining whether the computing device is connected to the particular vehicle, such as discussed above in the context of at least FIGS. 3-11. In particular of these embodiments, determining whether the computing device is available to perform the particular functional task includes: after determining that the computing device is connected to the particular vehicle, providing an output of the computing device requesting the input to initiate performance of the particular functional task on the particular vehicle, such as discussed above in the context of at least FIGS. 3-11. In other particular of these embodiments, determining whether the computing device is available to perform the particular functional task includes: after determining that the computing device is not connected to the particular vehicle, providing an output of the computing device requesting a connection between the particular vehicle and the computing device, such as discussed above in the context of at least FIGS. 3-11. In even other particular of these embodiments, determining whether the computing device is available to perform the particular functional task includes: after providing the output of the computing device requesting a connection between the particular vehicle and the computing device, determining whether the computing device is now connected to the particular vehicle; and after determining that the computing device is now connected to the particular vehicle, providing an output of the computing device requesting the input to initiate performance of the particular functional task on the particular vehicle, such as discussed above in the context of at least FIGS. 3-11.

At block 1440, the computing device can, after determining that the computing device is available to perform the particular functional task, receive an input to initiate performance of the particular functional task on the particular vehicle, such as discussed above in the context of at least FIGS. 3-11.

At block 1450, the computing device can, after receiving the input, send a message to the particular vehicle to initiate performance of the particular functional task on the particular vehicle, such as discussed above in the context of at least FIGS. 3-11.

At block 1460, the computing device can, after sending the message, display a notification indicative of performing the particular functional task on the particular vehicle, such as discussed above in the context of at least FIGS. 3-11.

In some embodiments, the repair session further includes: completing the particular functional task on the particular vehicle using the computing device; and providing an indication that the particular functional task has been completed using the computing device, such as discussed above in the context of at least FIGS. 3-11. In some of these embodiments, the indication that the particular functional task has been completed using the computing device includes an indication of a result of a test performed as part of the particular functional task, such as discussed above in the context of at least FIGS. 3-11.

In some embodiments, method 1400 further includes: after receiving the input to initiate performance of the particular functional task on the particular vehicle, the computing device displaying a notification requesting initiation of the particular functional task, such as discussed above in the context of at least FIGS. 3-11.

Enumerated Example Embodiments

Embodiments of the present disclosure may relate to one or more of the enumerated example embodiments (EEEs) listed below.

EEE 1 is a method comprising: repairing a particular vehicle during a repair session using a computing device, the repair session comprising: receiving, at the computing device, a functional task setup that comprises a first identifier and a second identifier, wherein the first identifier identifies the particular vehicle, and wherein the second identifier identifies a particular functional task for the computing device to perform on the particular vehicle; using the computing device to determine whether the computing device is available to perform the particular functional task; after determining that the computing device is available to perform the particular functional task, the computing device receiving an input to initiate performance of the particular functional task on the particular vehicle; after receiving the input, the computing device sending a message to the particular vehicle to initiate performance of the particular functional task on the particular vehicle; and after sending the message, the computing device displaying a notification indicative of performing the particular functional task on the particular vehicle.

EEE 2 is the method of EEE 1, wherein the repair session further comprises: completing the particular functional task on the particular vehicle using the computing device; and providing an indication that the particular functional task has been completed using the computing device.

EEE 3 is the method of EEE 2, wherein the indication that the particular functional task has been completed using the computing device comprises an indication of a result of a test performed as part of the particular functional task.

EEE 4 is the method of any one of EEEs 1-3, wherein the first identifier comprises information related to a year of manufacture of the particular vehicle, a manufacturer of the particular vehicle, and a model of the particular vehicle.

EEE 5 is the method of any one of EEEs 1-4, wherein the first identifier comprises information related to a VIN of the particular vehicle.

EEE 6 is the method of any one of EEEs 1-5, wherein the particular functional task comprises: a task of transmitting a message to an ECU of the particular vehicle, a task of performing one or more component tests of a particular component of the particular vehicle, a task of performing one or more functional tests of a particular component on the particular vehicle, a task of performing a reset procedure to the particular component on the particular vehicle, a task of calibrating a system comprising the particular component on the particular vehicle, or a task of reprogramming an ECU of the particular vehicle.

EEE 7 is the method of any one of EEEs 1-6, wherein determining whether the computing device is available to perform the particular functional task comprises determining whether the computing device is already performing another functional task.

EEE 8 is the method of EEE 7, wherein determining whether the computing device is available to perform the particular functional task comprises: after determining that the computing device is already performing another functional task, providing an output of the computing device indicating receipt of the functional task setup.

EEE 9 is the method of EEE 7 or EEE 8, wherein determining whether the computing device is available to perform the particular functional task comprises: after determining that the computing device is not already performing another functional task, providing an output of the computing device requesting the input to initiate performance of the particular functional task on the particular vehicle.

EEE 10 is the method of any one of EEEs 1-9, wherein determining whether the computing device is available to perform the particular functional task comprises: determining whether the computing device is connected to the particular vehicle.

EEE 11 is the method of EEE 10, wherein determining whether the computing device is available to perform the particular functional task comprises: after determining that the computing device is connected to the particular vehicle, providing an output of the computing device requesting the input to initiate performance of the particular functional task on the particular vehicle.

EEE 12 is the method of EEE 10 or EEE 11, wherein determining whether the computing device is available to perform the particular functional task comprises: after determining that the computing device is not connected to the particular vehicle, providing an output of the computing device requesting a connection between the particular vehicle and the computing device.

EEE 13 is the method of EEE 12, wherein determining whether the computing device is available to perform the particular functional task comprises: after providing the output of the computing device requesting a connection between the particular vehicle and the computing device, determining whether the computing device is now connected to the particular vehicle; and after determining that the computing device is now connected to the particular vehicle, providing an output of the computing device requesting the input to initiate performance of the particular functional task on the particular vehicle.

EEE 14 is the method of any one of EEEs 1-13, further comprising: after receiving the input to initiate performance of the particular functional task on the particular vehicle, the computing device displaying a notification requesting initiation of the particular functional task.

EEE 15 is a computing device, comprising: a processor; and a non-transitory computer readable medium configured to store at least executable instructions, wherein the executable instructions, when executed by the processor, cause the computing device to perform functions comprising the method of any one of EEEs 1-14.

EEE 16 is a non-transitory computer readable medium configured to store at least executable instructions, wherein the executable instructions, when executed by a processor of a computing device, cause the computing device to perform functions comprising the method of any one of EEEs 1-14.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural or singular number, respectively. Additionally, the words "herein," "above" and "below" and words of similar import, when used in this application, shall refer to this application as a whole and not to any particular portions of this application.

The above description provides specific details for a thorough understanding of, and enabling description for, embodiments of the disclosure. However, one skilled in the art will understand that the disclosure may be practiced without these details. In other instances, well-known structures and functions have not been shown or described in detail to avoid unnecessarily obscuring the description of the embodiments of the disclosure. The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize.

All of the references cited herein are incorporated by reference. Aspects of the disclosure can be modified, if necessary, to employ the systems, functions and concepts of the above references and application to provide yet further embodiments of the disclosure. These and other changes can be made to the disclosure in light of the detailed description.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time; e.g., volatile memory, register memory, processor cache, and/or random access memory (RAM). The computer readable media may also include non-transitory computer readable media that stores program code and/or data for longer periods of time; e.g., non-volatile memory, secondary or persistent long term storage, read only memory (ROM), optical or magnetic disks, compact-disc read only memory (CD-ROM). The computer readable media may also be any other volatile or non-volatile storage systems. A computer readable medium may be considered a computer readable storage medium, for example, or a tangible and/or non-transitory storage medium and/or device.

Moreover, a block that represents one or more information transmissions may correspond to information transmissions between software and/or hardware modules and/or executables in the same physical device. However, other information transmissions may be between software and/or hardware modules and/or executables in different physical devices.

Numerous modifications and variations of the present disclosure are possible in light of the above teachings.

The invention claimed is:

1. A method of using first and second computing systems and a server to perform a functional task during a repair session, wherein the second computing system communicates with the server over the Internet, and the second computing system comprises a testing component including test leads and one or more of the following electronic measuring components: a digital oscilloscope, a digital ammeter, a digital voltmeter, a digital ohmmeter, or a digital multi-meter, the method comprising:

receiving, at the first computing system, a vehicle identifier for determining a year, make, and model corresponding to a particular vehicle;

providing, on a display at the first computing system, a first selectable user-interface element corresponding to a first task performable on the particular vehicle using the second computing system;

transmitting, from the first computing system to the server in response to a selection of the first selectable user-interface element on the display at the first computing system, a first link including the vehicle identifier, a selection identifier corresponding to the first selectable user-interface element, and an identifier of the second computing system;

determining, at the server based on the first link, a first functional task setup including the vehicle identifier and an identifier of a first functional task, and that the second computing system is a destination for the first functional task setup based on the identifier of the second computing system;

transmitting, from the server to the second computing system, the first functional task setup;

in response to receipt of the first functional task setup from the server, the second computing system determining the second computing system is available to perform the first functional task, bypassing menu-based interfaces corresponding to selection of the particular vehicle and to selection of the first functional task from among multiple functional tasks performable on the particular vehicle, and displaying, on a display at the second computing system, a menu option to initiate a performance of the first functional task on the particular vehicle by the testing component;

receiving, at the server from the second computing system, a first output related to the performance of the first functional task on the particular vehicle by the testing component;

transmitting a second link from the server to the first computing system, wherein content of the second link includes the first output;

displaying, on the display at the first computing system based on the content of the second link, a first dialog that indicates a status related to the performance of the first functional task on the particular vehicle by the testing component, wherein the status is based on the first output; and ending the repair session via the first computing system based on the displayed content of the second link.

2. The method of claim 1, wherein the identifier of the first functional task indicates a component test for the second computing system to perform on the particular vehicle.

3. The method of claim 1, wherein:

the second computing system and the particular vehicle communicate with each other using a wired or wireless network local to the second computing system and the particular vehicle, and the method further comprises:

providing, on the display at the first computing system, a second selectable user-interface element corresponding to a second task performable on the particular vehicle using the second computing system;

transmitting, from the first computing system to the server in response to a selection of the second selectable user-interface element on the display at the first computing system, a third link including the vehicle identifier, a selection identifier corresponding to the second selectable user-interface element, and an identifier of the second computing system;

determining, at the server based on the third link, a second functional task setup including the vehicle identifier and an identifier of a second functional task, wherein the identifier of the second functional task indicates a task of performing a reset procedure to a vehicle component of the particular vehicle, a task of calibrating the vehicle component, or a task of reprogramming the vehicle component;

transmitting, from the server to the second computing system, the second functional task setup;

receiving, at the server from the second computing system, a second output related to performance of the second functional task on the particular vehicle using the second computing system;

transmitting a fourth link from the server to the first computing system, wherein content of the fourth link includes the second output; and displaying, on the display at the first computing system based on content of the fourth link, a second dialog that indicates a status of the performance of the second functional task on the particular vehicle using the second computing system, wherein the status of the performance of the second functional task is based on the second output.

4. The method of claim 3, further comprising:

scanning, via the second computing system, the particular vehicle for diagnostic trouble codes, wherein scanning the particular vehicle includes:

the second computing system sending one or more messages to the particular vehicle over the wired or wireless network to request the diagnostic trouble codes, and the second computing system receiving from the particular vehicle over the wired or wireless network one or more responses indicative of the diagnostic trouble codes.

5. The method of claim 1, further comprising:

displaying, on the display at the second computing system, a notification indicating the first functional task setup was received.

6. The method of claim 1, wherein the identifier of the first functional task is associated with a first menu selection of a particular menu that is provided on a display of the second computing system.

7. The method of claim 1, wherein:

the first dialog includes a button selectable to continue with the repair session, and the method further comprises:

closing the first dialog and continuing with the repair session in response to a selection of the button, and continuing with the repair session includes performing a second functional task on the particular vehicle using the second computing system.

8. The method of claim 1, wherein receiving the vehicle identifier includes receiving a vehicle identification number corresponding to the particular vehicle or information indicating the year, make, and model of the particular vehicle.

9. The method of claim 1, wherein the first computing system and the server communicate with each other over the Internet, a local area network, or a corporate intranet.

10. The method of claim 1, wherein:
the first output indicates a status indicator of performing the first functional task, and
the status indicator indicates the first functional task was completed, the first functional task was not completed, or the first functional task was partially completed.

11. The method of claim 1, wherein the first output includes data for one or more measurements made during performance of the first functional task.

12. The method of claim 1, further comprising:
determining a user-interface element displayed on the first computing system is selected,
wherein ending the repair session via the first computing system occurs in response to determining the user-interface element displayed on the first computing system is selected.

13. A computing system comprising:
a set of multiple processors distributed across first and second computing systems and a server to perform a functional task during a repair session, wherein the second computing system communicates with the server other over the Internet, and the second computing system comprises a testing component including test leads and one or more of the following electronic measuring components: a digital oscilloscope, a digital ammeter, a digital voltmeter, a digital ohmmeter, or a digital multi-meter;
a display at the first computing system; and
non-transitory computer-readable memory distributed across the first computing system, the second computing system, and the server, the memory storing executable instructions, wherein execution of the executable instructions by the set of multiple processors causes the computing system to perform functions including:
receiving, at the first computing system, a vehicle identifier for determining a year, make, and model corresponding to a particular vehicle;
providing, on the display at the first computing system, a first selectable user-interface element corresponding to a first task performable on the particular vehicle using the second computing system;
transmitting, from the first computing system to the server in response to a selection of the first selectable user-interface element on the display at the first computing system, a first link including the vehicle identifier, a selection identifier corresponding to the first selectable user-interface element, and an identifier of the second computing system;
determining, at the server based on the first link, a first functional task setup including the vehicle identifier and an identifier of a first functional task, and that the second computing system is a destination for the first functional task setup based on the identifier of the second computing system;
transmitting, from the server to the second computing system, the first functional task setup;
in response to receipt of the first functional task setup from the server, the second computing system determining the second computing system is available to perform the first functional task, bypassing menu-based interfaces corresponding to selection of the particular vehicle and to selection of the first functional task from among multiple functional tasks performable on the particular vehicle, and displaying, on a display at the second computing system, a menu option to initiate a performance of the first functional task on the particular vehicle by the testing component;
receiving, at the server from the second computing system, a first output related to the performance of the first functional task on the particular vehicle by the testing component;
transmitting a second link from the server to the first computing system, wherein content of the second link includes the first output;
displaying, on the display at the first computing system based on the content of the second link, first dialog that indicates a status related to the performance of the first functional task on the particular vehicle by the testing component, wherein the status is based on the first output; and
ending the repair session via the first computing system based on the displayed content of the second link.

14. The computing system of claim 13, wherein the identifier of the first functional task indicates a component test for the second computing system to perform on the particular vehicle.

15. The computing system of claim 13, wherein:
the second computing system and the particular vehicle communicate with each other using a wired or wireless network local to the second computing system and the particular vehicle, and
the functions further include:
providing, on the display at the first computing system, a second selectable user-interface element corresponding to a second task performable on the particular vehicle using the second computing system;
transmitting, from the first computing system to the server in response to a selection of the second selectable user-interface element on the display at the first computing system, a third link including the vehicle identifier, a selection identifier corresponding to the second selectable user-interface element, and an identifier of the second computing system;
determining, at the server based on the third link, a second functional task setup including the vehicle identifier and an identifier of a second functional task, the identifier of the second functional task indicates a task of performing a reset procedure to a vehicle component of the particular vehicle, a task of calibrating the vehicle component, or a task of reprogramming the vehicle component;
transmitting, from the server to the second computing system, the second functional task setup;
receiving, at the server from the second computing system, a second output related to performance of the second functional task on the particular vehicle using the second computing system;
transmitting a fourth link from the server to the first computing system, wherein content of the fourth link includes the second output; and
displaying, on the display at the first computing system based on content of the fourth link, a second dialog that indicates a status of the performance of the second functional task on the particular vehicle using the second computing system, wherein the status of the performance of the second functional task is based on the second output.

16. The computing system of claim 15, wherein:
the functions further include scanning, via the second computing system, the particular vehicle for diagnostic trouble codes, and scanning the particular vehicle includes:

the second computing system sending one or more messages to the particular vehicle over the wired or wireless network to request the diagnostic trouble codes, and the second computing system receiving from the particular vehicle over the wired or wireless network one or more responses indicative of the diagnostic trouble codes.

17. The computing system of claim 13, wherein the functions further include:

displaying, on the display at the second computing system, a notification indicating the first functional task setup was received.

18. The computing system of claim 13, wherein the identifier of the first functional task is associated with a first menu selection of a particular menu that is provided on a display of the second computing system.

19. The computing system of claim 13, wherein:

the first dialog includes a button selectable to continue with the repair session, and the functions further include:

closing the first dialog and continuing with the repair session in response to a selection of the button, and continuing with the repair session includes performing a second functional task on the particular vehicle using the second computing system.

20. The computing system of claim 13, wherein receiving the vehicle identifier includes receiving a vehicle identification number corresponding to the particular vehicle or information indicating the year, make, and model of the particular vehicle.

* * * * *